(12) United States Patent
Menard et al.

(10) Patent No.: US 11,159,231 B2
(45) Date of Patent: *Oct. 26, 2021

(54) METHODS AND SYSTEMS RELATING TO OPTICAL NETWORKS

(71) Applicant: AEPONYX INC., Montreal (CA)

(72) Inventors: Francois Menard, Trois-Rivieres (CA); Martin Berard, Repentigny (CA)

(73) Assignee: Aeponyx Inc., Repentigny (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,916

(22) Filed: Apr. 29, 2021

(65) Prior Publication Data

US 2021/0273721 A1 Sep. 2, 2021

Related U.S. Application Data

(60) Continuation of application No. 16/657,352, filed on Oct. 18, 2019, now Pat. No. 11,012,151, which is a
(Continued)

(51) Int. Cl.
*H04J 14/00* (2006.01)
*H04B 10/071* (2013.01)
(Continued)

(52) U.S. Cl.
CPC ....... *H04B 10/071* (2013.01); *G02B 6/29395* (2013.01); *G02B 6/3584* (2013.01);
(Continued)

(58) Field of Classification Search
CPC ....... H04B 10/071; H04B 10/40; H04J 14/00; H04J 14/021; H04J 14/0212;
(Continued)

(56) References Cited

U.S. PATENT DOCUMENTS 6,567,574 B1 * 5/2003 Ma .................... H04Q 11/0005
385/16
6,577,785 B1 * 6/2003 Spahn .................... G02B 6/122
385/22
(Continued)

OTHER PUBLICATIONS

Wang et al, "Novel approach for microassembly of three dimensional rotary MOEMS mirrors", Oct. 2009, Journal of Micro/Nanolithography MEMS and MOEMS, 2009.

*Primary Examiner* — Dibson J Sanchez
(74) *Attorney, Agent, or Firm* — Rosenberg, Klein & Lee

(57) ABSTRACT

Data center interconnections, which encompass WSCs as well as traditional data centers, have become both a bottleneck and a cost/power issue for cloud computing providers, cloud service providers and the users of the cloud generally. Fiber optic technologies already play critical roles in data center operations and will increasingly in the future. The goal is to move data as fast as possible with the lowest latency with the lowest cost and the smallest space consumption on the server blade and throughout the network. Accordingly, it would be beneficial for new fiber optic interconnection architectures to address the traditional hierarchal time-division multiplexed (TDM) routing and interconnection and provide reduced latency, increased flexibility, lower cost, lower power consumption, and provide interconnections exploiting N×M×D Gbps photonic interconnects wherein N channels are provided each carrying M wavelength division signals at D Gbps.

18 Claims, 23 Drawing Sheets

Related U.S. Application Data division of application No. 15/124,479, filed as application No. PCT/CA2015/000139 on Mar. 10, 2015, now Pat. No. 10,454,572.

(60) Provisional application No. 61/950,238, filed on Mar. 10, 2014.

(51) Int. Cl.

| | | |
|---|---|---|
| *G02B 6/293* | (2006.01) | |
| *G02B 6/35* | (2006.01) | |
| *H04J 14/02* | (2006.01) | |
| *H04Q 11/00* | (2006.01) | |
| *H04B 10/40* | (2013.01) | |

(52) U.S. Cl.
CPC ........ *H04J 14/021* (2013.01); *H04J 14/0212* (2013.01); *H04J 14/0213* (2013.01); *H04J 14/0267* (2013.01); *H04J 14/0275* (2013.01); *H04J 14/0278* (2013.01); *H04Q 11/0005* (2013.01); *H04Q 11/0066* (2013.01); *H04B 10/40* (2013.01); *H04J 14/00* (2013.01); *H04Q 11/00* (2013.01); *H04Q 11/0001* (2013.01); *H04Q 2011/003* (2013.01); *H04Q 2011/0009* (2013.01); *H04Q 2011/0016* (2013.01); *H04Q 2011/0018* (2013.01); *H04Q 2011/0083* (2013.01)

(58) Field of Classification Search
CPC ............... H04J 14/0278; H04J 14/0213; H04J 14/0267; H04J 14/0275; G02B 6/29395; G02B 6/3584; H04Q 2011/003; H04Q 2011/0083; H04Q 2011/0016; H04Q 2011/0018; H04Q 11/0066; H04Q 11/0005; H04Q 11/0001; H04Q 2011/0009; H04Q 11/00
USPC .................................................. 398/43–103
See application file for complete search history.

(56) References Cited

U.S. PATENT DOCUMENTS

| | | | |
|---|---|---|---|
| 6,980,572 B2 | 12/2005 | Geske | |
| 7,184,666 B1 | 2/2007 | Li et al. | |
| 7,254,335 B1 | 8/2007 | Collings et al. | |
| 7,283,709 B2 | 10/2007 | Doerr et al. | |
| 9,176,282 B2 | 11/2015 | Pottier et al. | |
| 2001/0036206 A1 | 11/2001 | Jerman et al. | |
| 2002/0018496 A1 | 2/2002 | Gutin | |
| 2002/0085594 A1 | 7/2002 | Pezeshki et al. | |
| 2002/0131673 A1* | 9/2002 | Hung | G02B 6/12007 385/16 |
| 2002/0176658 A1 | 11/2002 | Prohaska | |
| 2003/0007202 A1 | 1/2003 | Moser et al. | |
| 2003/0007523 A1 | 1/2003 | Chapman et al. | |
| 2003/0039275 A1 | 2/2003 | Pezeshki | |
| 2003/0053748 A1 | 3/2003 | Kim | |
| 2003/0193974 A1 | 10/2003 | Frankel et al. | |
| 2003/0223471 A1 | 12/2003 | Baney | |
| 2004/0071395 A1* | 4/2004 | Hsu | G02B 6/10 385/22 |
| 2004/0086214 A1 | 5/2004 | Huang et al. | |
| 2004/0136074 A1* | 7/2004 | Ford | G02B 6/29314 359/572 |
| 2004/0213306 A1 | 10/2004 | Fennema et al. | |
| 2005/0135731 A1 | 6/2005 | Welch et al. | |
| 2005/0163171 A1 | 7/2005 | Ng et al. | |
| 2005/0180316 A1* | 8/2005 | Chan | H04J 14/0291 370/216 |
| 2005/0191054 A1 | 9/2005 | Aoki et al. | |
| 2006/0092996 A1 | 5/2006 | Nguyen et al. | |
| 2007/0058899 A1* | 3/2007 | Greywall | G02B 6/12019 385/16 |
| 2007/0086703 A1 | 4/2007 | Kirk et al. | |
| 2007/0160321 A1 | 7/2007 | Wu et al. | |
| 2008/0085119 A1 | 4/2008 | Ye et al. | |
| 2009/0154918 A1 | 6/2009 | Hinderthuer et al. | |
| 2009/0238217 A1 | 9/2009 | Moser et al. | |
| 2010/0183302 A1* | 7/2010 | Lamvik | G02B 6/136 398/45 |
| 2011/0216789 A1 | 9/2011 | Docter et al. | |
| 2013/0016973 A1 | 1/2013 | Zheng et al. | |
| 2013/0194649 A1 | 8/2013 | Zhou | |
| 2013/0279910 A1 | 10/2013 | Ziari et al. | |
| 2016/0049769 A1 | 2/2016 | Choi | |
| 2018/0348436 A1 | 12/2018 | Pottier et al. | |
| 2018/0348507 A1 | 12/2018 | Packirisamy et al. | |

* cited by examiner

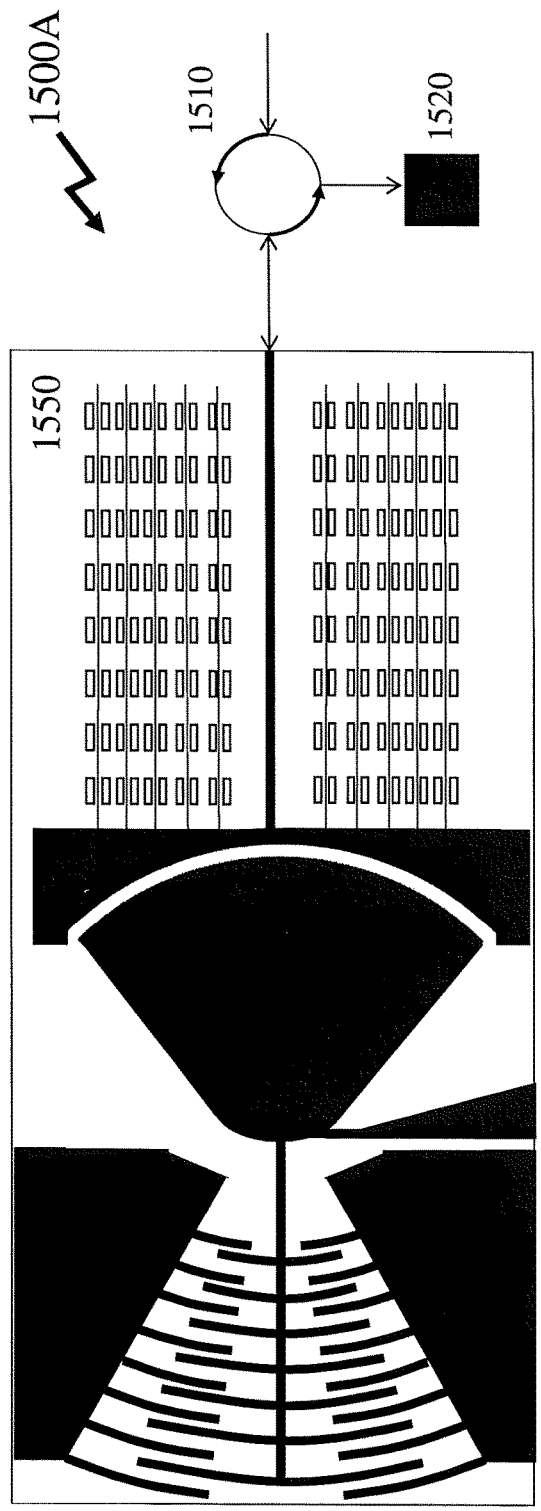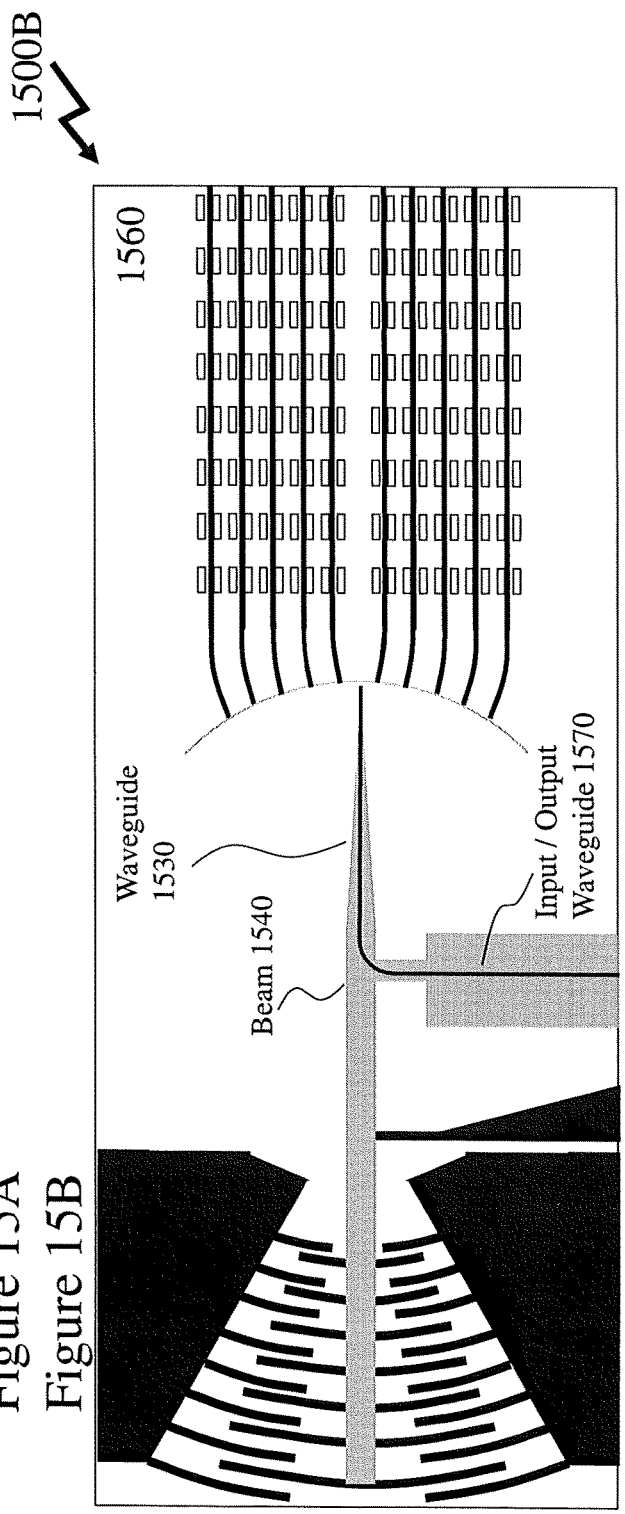
Figure 15A
Figure 15B

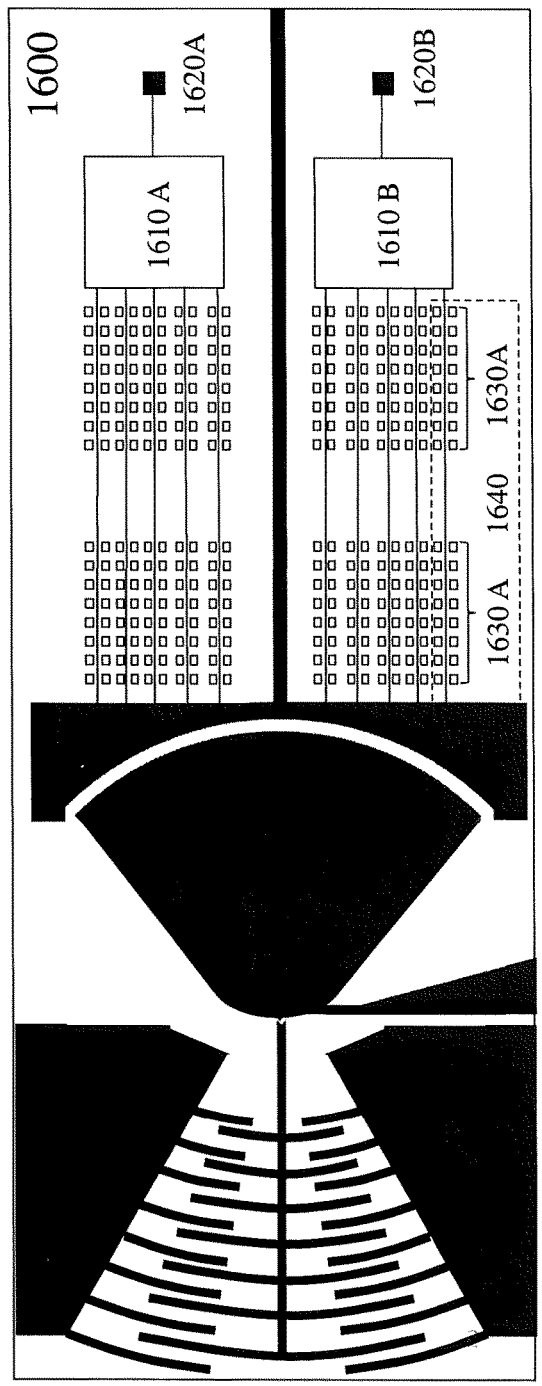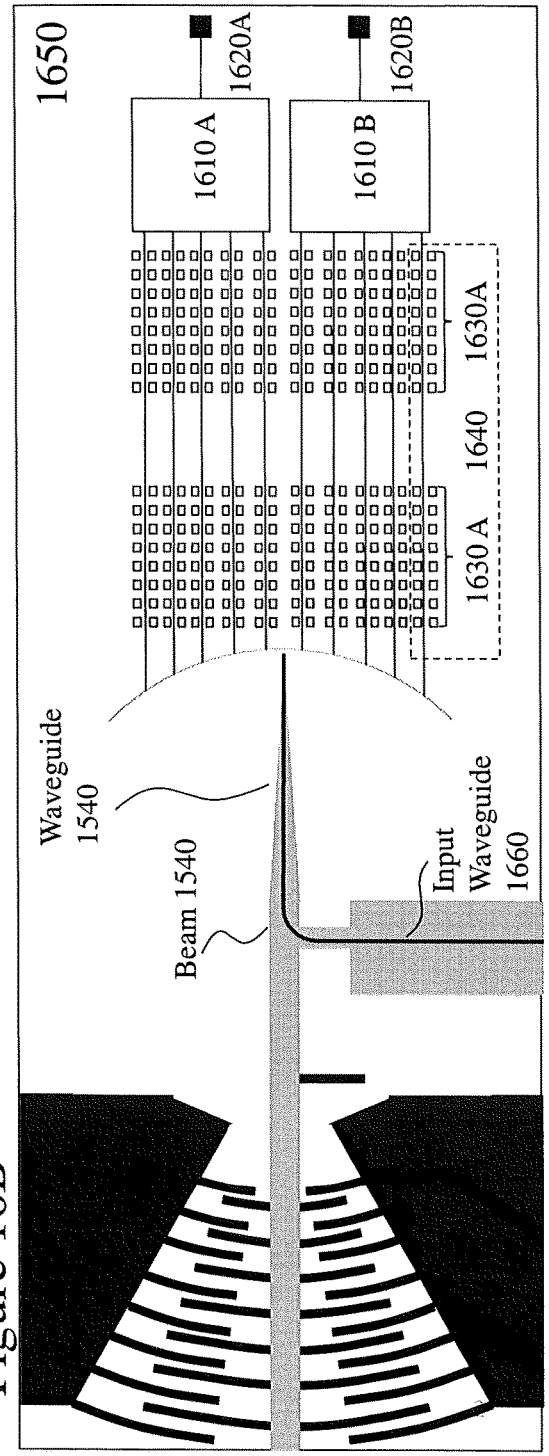
Figure 16A
Figure 16B ns341/ns525/ns537/ns705/ns827/white_paper_c11481360_

METHODS AND SYSTEMS RELATING TO OPTICAL NETWORKS

CROSS-REFERENCE TO RELATED APPLICATIONS

This application claims the benefit of priority as a continuation patent application of U.S. Ser. No. 16/657,352 filed Oct. 18, 2019 entitled "Methods and Systems Relating to Optical Networks"; which itself claims the benefit of priority as a divisional patent application of U.S. patent application Ser. No. 15/124,479 filed Sep. 8, 2016 entitled "Methods and Systems Relating to Optical Networks" which has issued as U.S. Pat. No. 10,454,572; which itself claims the benefit of priority as a 371 National Phase application of PCT/CA2015/000139 filed Mar. 10, 2015 entitled "Optical Device with Tunable Optical Wavelength Selective Circuit"; which itself claims the benefit of priority from U.S. Provisional Patent Application 61/950,238 filed Mar. 10, 2014 entitled "Methods and Systems Relating to Optical Networks", the entire contents of each being herein incorporated by reference.

FIELD OF THE INVENTION

This invention relates to optical networks and more particularly to wavelength division multiplexed networks for data center and cloud computing applications.

BACKGROUND OF THE INVENTION

Cloud computing is a phrase used to describe a variety of computing concepts that involve a large number of computers connected through a real-time communication network such as the Internet, see for example Carroll et al in "Securing Virtual and Cloud Environments" (Cloud Computing and Services Science, Service Science: Research and Innovations in the Service Economy, Springer Science Business Media, 2012). It is very similar to the concept of utility computing. In science, cloud computing is a synonym for distributed computing over a network, and means the ability to run a program or application on many connected computers at the same time.

In common usage, the term "the cloud" is essentially a metaphor for the Internet, see for example http://www.netlingo.com/word/cloud-computing.php. Marketers have further popularized the phrase "in the cloud" to refer to software, platforms and infrastructure that are sold "as a service", i.e. remotely through the Internet. Typically, the seller has actual energy-consuming servers which host products and services from a remote location, so end-users don't have to; they can simply log on to the network without installing anything. The major models of cloud computing service are known as software as a service, platform as a service, and infrastructure as a service. These cloud services may be offered in a public, private or hybrid network. Today, Google, Amazon, Oracle Cloud, Salesforce, Zoho and Microsoft Azure are some of the better known cloud vendors. Whilst cloud computing can be everything from applications to data centers a common theme is the pay-for-use basis.

The major cloud vendors provide their services through their own data centers whilst other third party providers access either these data centers or others distributed worldwide to store and distribute the data on the Internet as well as process this data. Considering just Internet data then with an estimated 100 billion plus web pages on over 100 million websites, data centers contain a lot of data. With almost two billion users accessing all these websites, including a growing amount of high bandwidth video, it's easy to understand but hard to comprehend how much data is being uploaded and downloaded every second on the Internet. At present the compound annual growth rate (CAGR) for global IP traffic between users is between 40% based upon Cisco's analysis (see http://www.cisco.com/en/US/solutions/collateral/ns341/ns525/ns537/ns705/ns827/white_paper_c11481360_ns827_Networking_Solutions_White_Paper.html) and 50% based upon the University of Minnesota's Minnesota Internet Traffic Studies (MINTS) analysis. By 2016 this user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data will flow to and from users via data centers and accordingly between data centers and within data centers so that these IP traffic flows must be multiplied many times to establish total IP traffic flows. Data centers are filled with tall racks of electronics surrounded by cable racks where data is typically stored on big, fast hard drives. Servers are computers that take requests to retrieve, process, or send data and access it using fast switches to access the right hard drives. Routers connect the servers to the Internet. At the same time these data centers individually and together provide homogenous interconnected computing infrastructures. When hosted in massive data centers these are also known as warehouse scale computers (WSC) which provide ubiquitous interconnected platforms as a shared resource for many distributed services.

At the same time as requiring a cost-effective yet scalable way of interconnecting data centers and WSCs internally and to each other most datacenter and WSC applications are provided free of charge such that the operators of this infrastructure are faced not only with the challenge of meeting exponentially increasing demands for bandwidth without dramatically increasing the cost and power of their infrastructure. At the same time consumers' expectations of download/upload speeds and latency in accessing content provide additional pressure.

Accordingly data center interconnections, wherein we encompass WSCs as well as traditional data centers within the term data center, have become both a bottleneck and a cost/power issue. Fiber optic technologies already play critical roles in data center operations and will increasingly. The goal is to move data as fast as possible with the lowest latency with the lowest cost and the smallest space consumption on the server blade and throughout the network.

According to Facebook™, see for example Farrington et al in "Facebook's Data Center Network Architecture" (IEEE Optical Interconnects Conference, 2013 available at http://nathanfarrington.com/presentations/facebook-optics-oida13-slides.pptx), there can be as high as a 1000:1 ratio between intra-data center traffic to external traffic over the Internet based on a single simple request. Within data center's 90% of the traffic inside data centers is intra-cluster. Further, Farrington notes that whilst a Folded Clos topology provides the best economics at the largest scales the cabling complexity is a daunting problem as it is quadratic function of the number of nodes. Farrington notes that the issue of reducing the cabling complexity of Folded Clos topologies is an industry-wide problem worth solving.

Accordingly, it would be beneficial for new fiber optic interconnection architectures to address the traditional hierarchal time-division multiplexed (TDM) routing and interconnection and provide reduced latency, increased flexibility, lower cost, lower power consumption, and provide interconnections exploiting N×M×D Gbps photonic interconnects wherein N channels are provided each carrying M wavelength division signals at D Gbps.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to optical networks and more particularly to wavelength division multiplexed networks for data center and cloud computing applications.

In accordance with an embodiment of the invention there is provided a device comprising:

a pluggable optic housing;

a pair of optical connectors or pigtails coupled to a receiver and a transmitter position allowing the daisy-chaining of multiple instances of the device as well as point to point connectivity between two instances of the device onto two fibers; and a tunable optical wavelength selective circuit comprising a plurality of wavelength selective filters and a rotatable microoptoelectromechanical system (MOEMS) for selecting a wavelength selective filter of the plurality of wavelength selective filters to tune the tunable optical wavelength selective circuit.

In accordance with an embodiment of the invention there is provided a network comprising a plurality of ROADM nodes where each ROADM node is capable of tuning to the same channel thereby enabling a wavelength or a group of wavelengths to be broadcast to the one or more ROADM nodes by configuring a tunable optical wavelength selective circuit within a node to tune to the same wavelength or group of wavelengths as another tunable optical wavelength selective circuit within a daisy chain of tunable optical wavelength selective circuits forming the plurality of ROADMs.

In accordance with an embodiment of the invention there is provided a network comprising a plurality of serially connected reconfigurable optical add-drop multiplexers (ROADMs), each ROADM providing for the addition of a first predetermined number of wavelength channels to a link within an optical network to which the ROADMs are connected and the subtraction of a second predetermined number of wavelength channels from the link of the optical network to which the ROADM is connected, wherein each ROADM is configured upon determination of its position within the plurality of serially connected ROADMs.

In accordance with an embodiment of the invention there is provided a network comprising a plurality of nodes, each node of the plurality of nodes being connected to N−1 subsequent sequential nodes via a wavelength division multiplexed link comprising at least M wavelengths, wherein each node of the plurality of nodes is connected to the next $N^{th}$ node via the $N^{th}$ wavelength of the at least M wavelengths.

In accordance with an embodiment of the invention there is provided a system comprising:

a MEMS based latching 1×N optical switch;

M optical sources, each optical source operating within a predetermined wavelength range; at least one optical time domain reflectometry (OTDR) signal;

M optical couplers, each optical coupler to overlay an OTDR signal to the M optical sources to a predetermined output of the N outputs of the 1×N optical switch; and a controller for determining whether to change the state of the MEMS based latching 1×N optical switch in dependence upon at least the OTDR signals from the M optical sources.

In accordance with an embodiment of the invention there is provided a device comprising:

a transceiver body, the body having an external physical geometry compliant to a predetermined optical transceiver standard a MEMS based latching 1×N optical switch;

a micro-controller integrated in the transceiver body for controlling the 1×N optical switch; wherein the input of the 1×N optical switch is for coupling to a first optical transceiver via at least one of a connectorised interface on the device and a fiber pigtail;

the N outputs of the 1×N optical switch are for coupling to N second optical transceivers via at least one of connectorised interfaces on the device and fiber pigtails.

In accordance with an embodiment of the invention there is provided a device comprising:

a transceiver body, the body having an external physical geometry compliant to a predetermined optical transceiver standard;

a reconfigurable optical add-drop switch employing a plurality of tunable optical wavelength selective circuits, each tunable optical wavelength selective circuit comprising a plurality of wavelength selective filters and a rotatable microoptoelectromechanical system (MOEMS) for selecting a wavelength selective filter of the plurality of wavelength selective filters to tune the tunable optical wavelength selective circuit; and an optical amplifier; wherein the reconfigurable optical add-drop switch and optical amplifier are packaged within the transceiver body.

In accordance with an embodiment of the invention there is provided a device comprising:

a polarization independent amplifier comprising:

a polarization splitter to split an incoming optical signal into TE and TM polarization components;

a polarization rotator to rotate the TM polarization to TE;

a pair of semiconductor optical amplifiers to amplify the pair of TE optical signals; and a combiner to combine the pair of outputs from the pair of semiconductor optical amplifiers; and a reconfigurable optical add-drop module for dropping and adding a predetermined band of wavelengths from a plurality of bands of optical wavelengths.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 15A, 15B, 16A and 16B depict optical receivers exploiting MEMS mirror elements in conjunction with wavelength selective reflecting and transmissive elements respectively;

DETAILED DESCRIPTION

Figure 1:
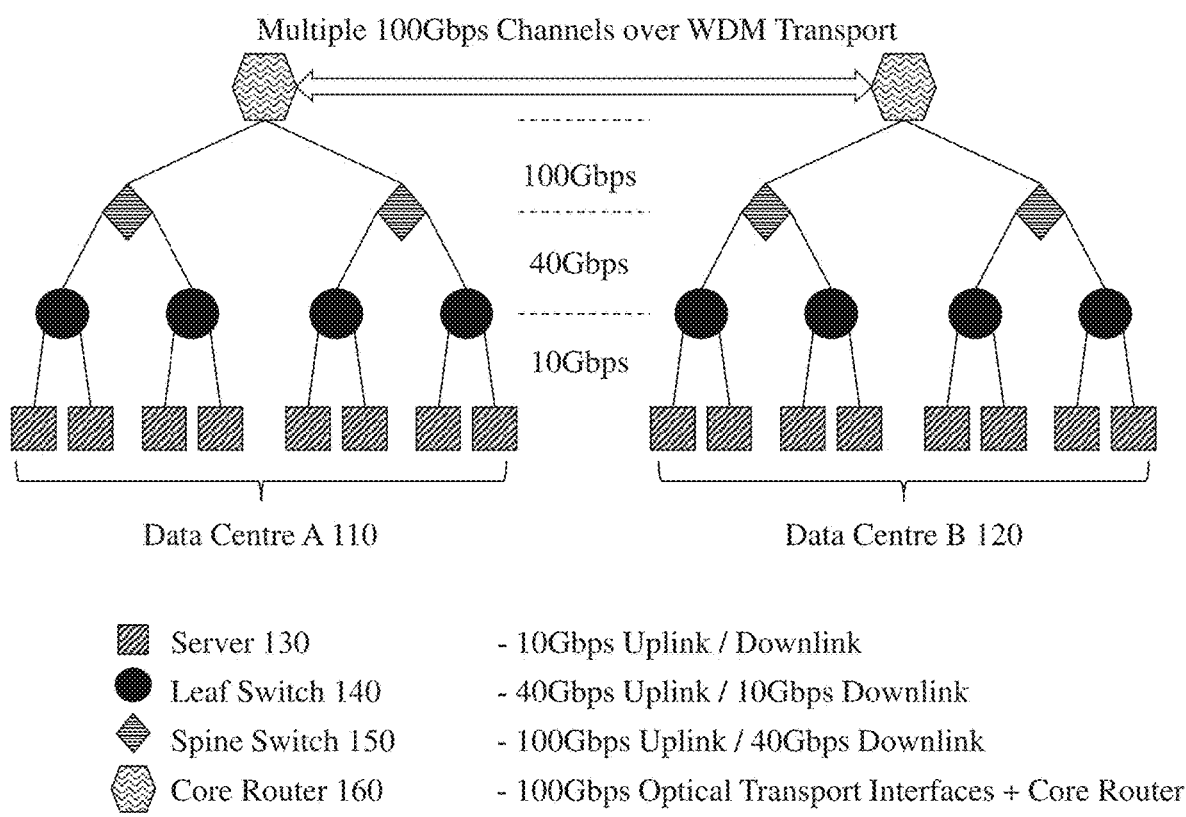
FIG. 1 depicts data center network connections according to the prior art.

The present invention is directed to optical networks and more particularly to wavelength division multiplexed networks for data center and cloud computing applications.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

1. Optical Leaf/Spline Switch Architectures Exploiting ROADM Transceivers

1A: Introduction

According to the North Bridge Venture Partners Future of Cloud Computing Third Annual 2013 Survey (http://www.northbridge.com/2013-cloud-computing-survey), the cloud was expected to reduce complexity, but experience has demonstrated the opposite. More than half (55.1%) of the respondents to the survey have indicated that hybrid/multi-cloud providers will likely benefit from the biggest growth opportunities over the next few years, as they are best positioned to ease the cloud complexity problem. A combination of a Public and a Private cloud forms a Hybrid Cloud. The combination of multiple Public Cloud services forms a Multi-Cloud. The combination of a Hybrid Cloud and a Multi-Cloud forms a Hybrid/Multi-Cloud (hereinafter referred to as an HM cloud).

It thus follows that the most successful datacenters will be those who will both connect multiple cloud providers to hosted enterprise private cloud infrastructures as well as facilitate seamless extensions of HM clouds all the way to the enterprise premise(s). With HM clouds, enterprises will now be able to switch more rapidly between providers of a specific application domain.

Historically, datacenter interconnections for a given customer took the form of a few cross-connects measuring tens of meters within a single datacenter. As needs have arisen for resilient hyperscale datacenters, cross-connects have increased to several hundreds of meters within the datacenter and have been extended to several tens of kilometers across datacenters within the same metropolitan market. Accordingly, new functionalities are required in datacom networks in order to enable the capabilities that are sought for by HM Cloud datacenter customers.

Accordingly, the inventors through embodiments of the invention are extending and adapting Wavelength Division Multiplexing for use within intra and inter data center applications allowing data center operators to truly scale out HM clouds. In parallel through World Patent Application PCT/CA2013/000086 filed Jan. 30, 2013 entitled "Method, Topology and Point of Presence Equipment for Serving a Plurality of Users via a Multiplex Module", the authors have described how to leverage the passive multipoint capabilities inherent to WDM-PON technology to allow for the future proofing of the underlying infrastructure for Software Defined Networking (SDN) and Network Functions Virtualization (NFV).

At the same time as supporting increased data flow, increased customer expectations and lower costs, no compromises can be made on the reliability of cloud computing communications that occur inside the datacenter, between datacenters and in the access of datacenters. To achieve what may be considered telecommunications grade resiliency requirements then cloud computing vendors need to consider issues such as geographic failover and load balancing across multiple datacenter facilities within a given metro market.

It thus follows that the most successful datacenters will be those who will also host seamlessly interconnected services from multiple diverse facilities within the same metropolitan market. In the past, it was sufficient to interconnect the datacenter hosted enterprise cloud infrastructure with the one on its premises. However, HM clouds require multipoint connectivity with many more degrees of interconnection to allow multiple cloud providers to reach both the datacenter hosted and the on premise enterprise private datacenter. Further, WDM-PON Technology enables links capable interconnecting HM Clouds across multiple datacenters that can be several kilometers apart.

Passive multipoint connectivity enabled by dense wavelength division multiplexing (DWDM) provides a futureproof upgrade path to extract more value out of existing fiber optic access networks. For example, WDM-PON technology enables 40 circuits of 10 Gbps to share a single optical fiber over unamplified distances of up to 40 kilometers. At the same time a single pair of optical fiber via WDM-PON also enables the passive multipoint steering to 40 different destinations within the outside plant.

Fiber optic network operators are now seeking to consolidate multiple smaller points of presence into larger datacenters in order to reduce their operational expenditures. WDM-PON Technology enables a similar split ratio than network based on power splitters such as EPON or GPON, but with the advantage of 50% less attenuation. A strong business case now supports the use of WDM-PON technology in the outside plant as a high-performance onramp to HM clouds. The use of WDM-PON technology for accessing datacenters then creates an opportunity for considering its use much deeper within the datacenter infrastructure to overcome limitations in current approaches to datacenter networking.

1B: Current State of the Art without DWDM Technology in Intra-Data Center Communications 1B.1: Managing Oversubscription to Control Costs in Two-Tier Leaf-Spine Architectures The majority of hyperscale datacenters networks today are designed around a two-tier leaf/spine Ethernet aggregation topology leveraging very high-density switches such as depicted in FIG. 1. Within this two-tier leaf/spine topology, the oversubscription ratio is the ratio of downlink ports to uplink ports when all ports are of equal speed. With 10 Gbps server interfaces, and considering these as part of a 3:1 oversubscribed architecture, then 40 Gbps of uplink bandwidth to the spine switches is necessary for every 12 servers. The 3:1 threshold today being generally seen as a maximum allowable level of oversubscription and is carefully understood and managed by the datacenter operators. Accordingly, a 3:1 oversubscribed leaf/spine/core architecture supporting communications within and between a pair of data centres, Data Centre A 110 and Data Centre 120 generally consists of servers 130 interconnected at 10 Gbps to Top of Rack (ToR) Ethernet switches that act as first level aggregation, the leaf switches 140. These ToR leaf switches 140 then uplink at 40 Gbps into end of row (EoR) Ethernet switches, which act as the spine switches 150 of the leaf/spine topology. As an example, with a 48-port ToR switch of 10 Gbps per port, ensuring a maximum 3:1 oversubscription ratio requires that the ToR switches have 16 uplink ports at 10 Gbps or alternatively, 4 ports at 40 Gbps. Then in order to enable connectivity across datacenters, the spine switches then connect at 100 Gbps to core routers 160, which then in turn interconnect to optical core infrastructure made up metro/long-haul DWDM/ROADMs transport platforms.

1B.2: Achieving Non-Blocking Connectivity in Two-Tier Leaf/Spine Architectures

Figure 2:
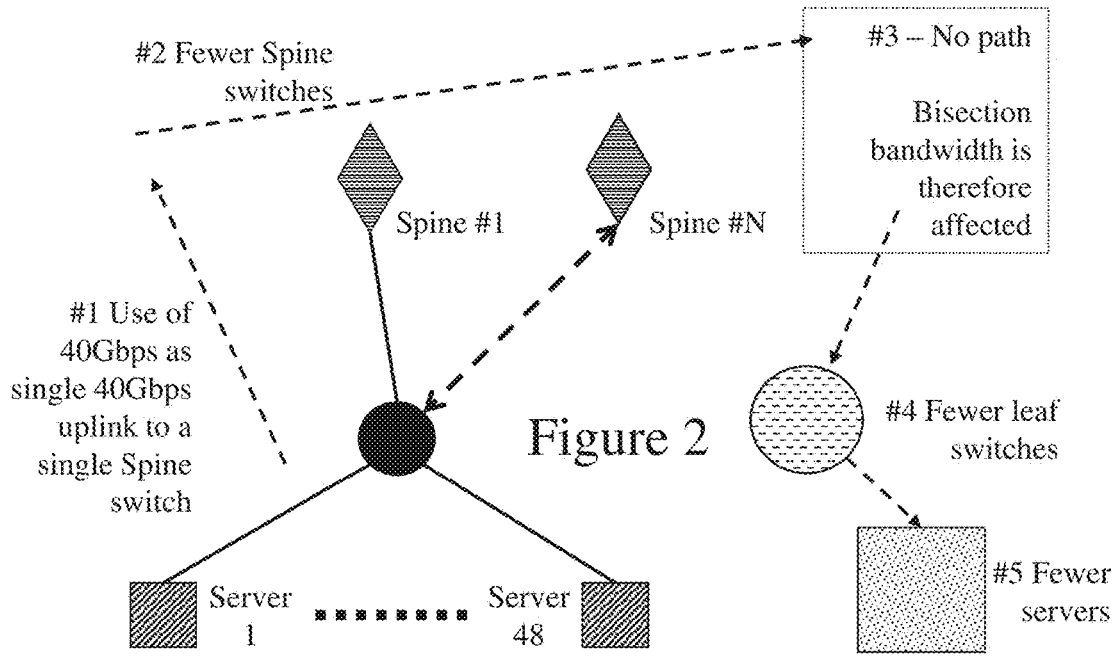
FIG. 2 depicts a two-tier leaf spine architecture according to the prior art with limited scaling out.
Figure 3:
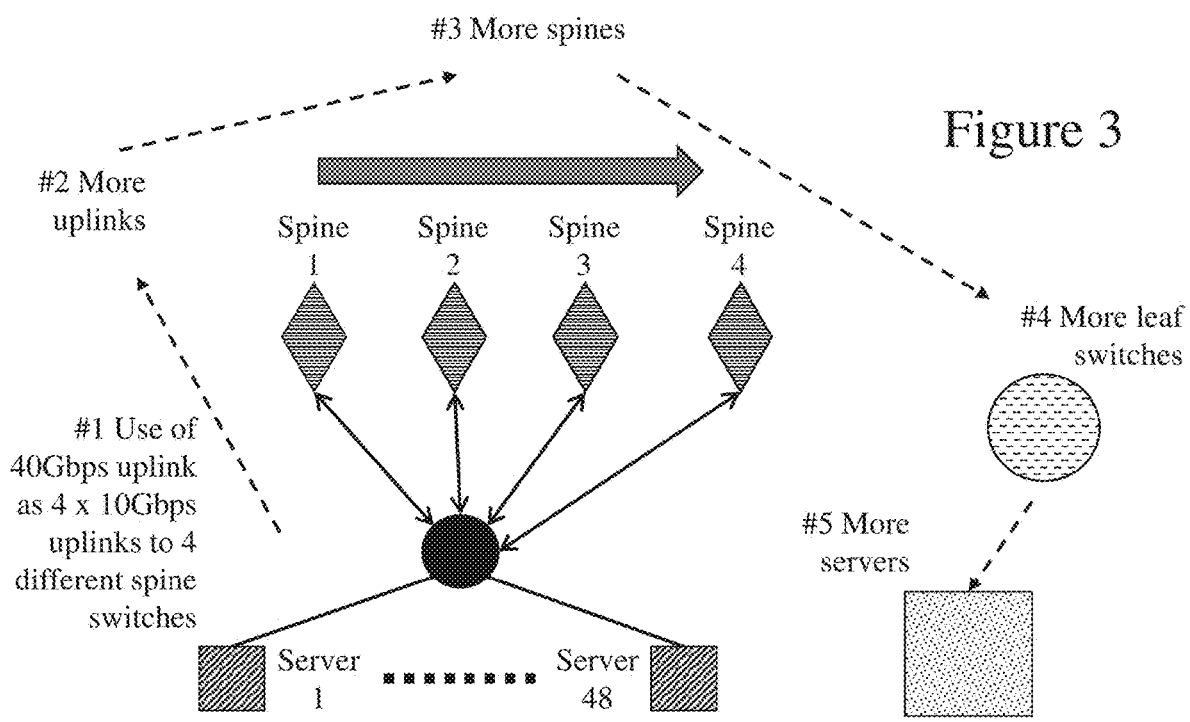
FIG. 3 depicts a two-tier leaf spine architecture according to an embodiment of the invention supporting scaling out.

In FIG. 2 the two-tier leaf spine architecture cannot scale out to add a maximum amount of servers within the chosen oversubscription parameter and at a constant latency. As depicted from the leaf a 40 Gbps uplink is made to a single spine switch, Spine #1, which therefore reduces the number of spine switches accessed such that some connections, e.g. Spine #N. Accordingly, the bisection bandwidth is affected and hence fewer leaf switches and thence fewer servers are connected. In contrast in FIG. 3, in a two-tier leaf/spine architecture according to an embodiment of the invention then it only scale out to add a maximum amount of servers within the chosen oversubscription parameter and at a constant latency, because every leaf switch is connected to every spine switch. Accordingly, to achieve this and scale out, the bandwidth of leaf switch uplinks at 40 Gbps is instead broken out as 4 links of 10 Gbps that are then connected to 4 distinct spine switches. Hence, more uplinks connect to more spines and thence more leaf switches and servers can be supported.

1C.1 Ring Network Leaf-Spine Connectivity Exploiting Reconfigurable Optical Add-Drop Multiplexer Using dense wavelength division multiplexing (DWDM) in conjunction with sub-band aggregation and an optical device that can tune a wavelength or a sub-band for both the transmission and reception side offers a novel datacenter interconnectivity methodology. Accordingly, embodiments of the invention allow for a reduction in the count of optical fiber links, the length of the optical fibers and also lower the number of required positions for connectivity.

Multiple nodes could also tune a reception wavelength or a sub-band altogether and provide multicast capabilities to multiple nodes sharing the same physical optical link medium. Multicast network traffic, with the continuous demand of more evolved distributed storage solution, has been a new important concept in datacenter network traffic. Other type of datacenter applications could also benefits from optical multicast traffic such as, high definition media streaming and high-performance computing (HPC) computation synchronization.

The invention is also novel in the propose approach of being a small form-factor pluggable (SFP) module. By daisy-chaining these optical devices, it is possible to convert a switch to a colorless, direction less and contention less (CDC) reconfigurable optical add-drop multiplexer (ROADM). By using more than one of these devices within an SFP switch, it would then convert it to an optical wavelength selection switch (WSS) capable of transmitting a reception wavelength to the same, or another wavelength on a different switch interface. The switch can then provide electrical power for the optical-electrical-optical (OEO) regenerator as well as inline optical amplification at both the port transmission and port reception sides.

The ROADM architecture propose is based on multiple micro-tunable silicon (MOTUS) optical engines such as described below in respect of FIG. 6 and within a U.S. Provisional Patent Application 61/949,484 by Francois Menard, Frederic Nabki and Michael Menard entitled "Methods and System for Wavelength Tunable Optical Components and Sub-Systems" exploiting silicon microelectromechanical systems (MEMS) and silicon photonic circuits to provide the switching functionality within a transmitter, receiver, ROADM, etc. An overview of the silicon MEMS and silicon photonics can be found within U.S. Provisional Patent Application 61/949,474 entitled "Mirror Based MicroElectroMechanical Systems and Methods" by Frederic Nabki et al. Due to the pass-through characteristic of the ROADM, an amplification mechanism is proposed to achieve a cascaded ROADM transceiver topology. To compensate for the insertion loss hit due to the complex internal optical structure of this device, a post amplification process is proposed. Alternatively post transmitter or pre-receiver amplification may be employed, the latter typically in conjunction with a variable optical attenuator (VOA) to prevent optical detector saturation. Using the active capacity of a transceiver a quantum dot (QD) amplification is proposed and to overcome the polarization dependent loss of such devices a dual QD amplifier with QD amplifiers on both axis so as to provide electrical to optical amplification of the pass-through signal as well as the newly inserted signal.

Figure 4:
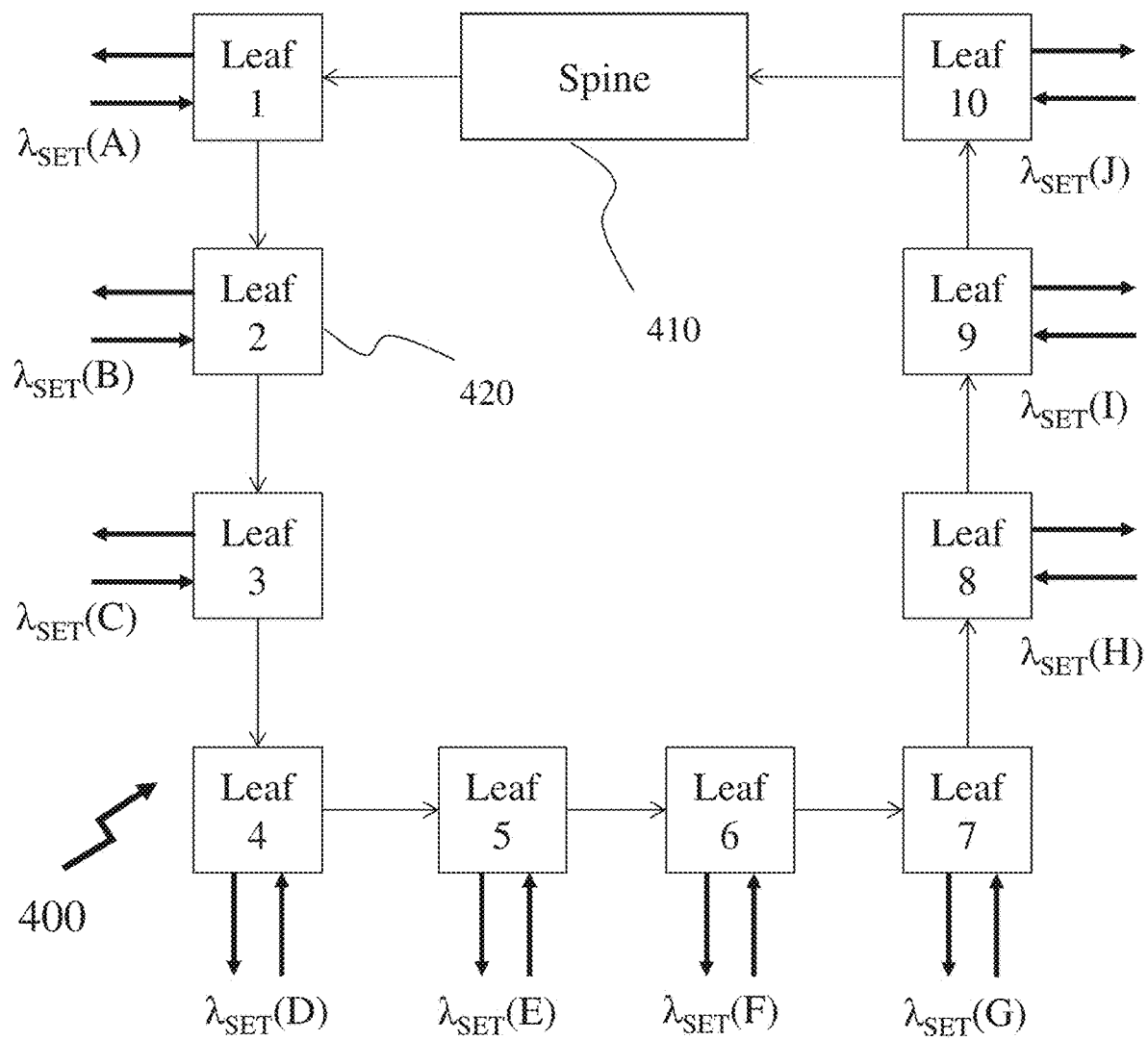
FIG. 4 depicts a two-tier leaf spine architecture according to an embodiment of the invention.
Figure 4:
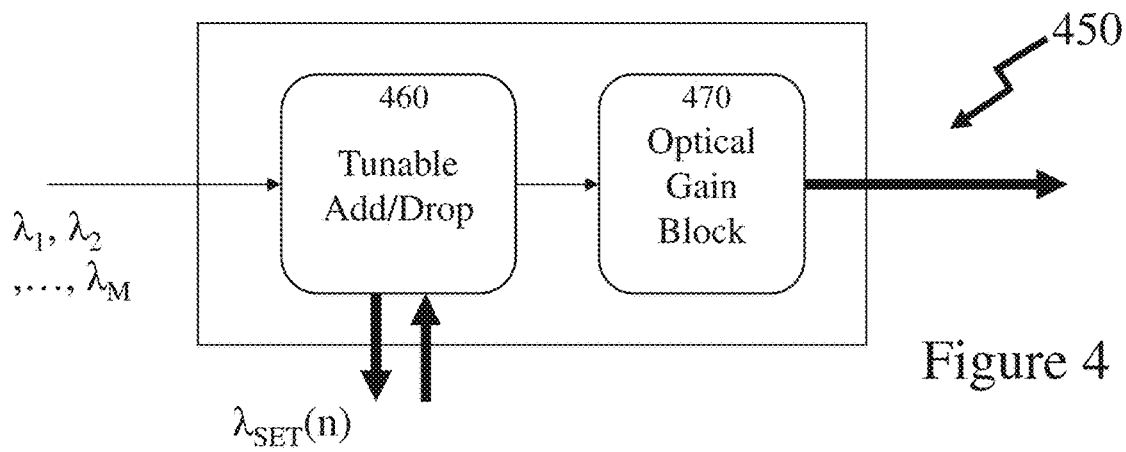

Referring to FIG. 4 there is depicted a WDM ring network 400 exploiting 40 channel DWDM transmission over a single singlemode optical fiber. Accordingly, as depicted 10 leaf switches 420, Leaf·1, Leaf·2, . . . , Leaf·10, are coupled in a ring to a single spine switch 410. At each leaf switch 420 a predetermined wavelength set is dropped and added to the singlemode optical fiber. For example at Leaf·4 this relates to $\lambda_{SET}(D)$ whilst at Leaf·8 this relates to $\lambda_{SET}(H)$. Alternatively, each leaf switch 420 may contain a tunable add-drop module such as depicted in schematic 450 in FIG. 4 comprising a tunable add-drop circuit 460 and an optical gain block 470 to either overcome the losses arising from the preceding fiber span and/or the tunable add-drop circuit 460 or amplify the signal to allow for losses in the subsequent fiber span and subsequent tunable add-drop circuit 460. The inventors refer to the tunable add-drop module depicted in schematic 450 as a Reconfigurable Optical Add/Drop Switch Transceiver with Electronic Regeneration (ROADSTER). Accordingly, tunable add-drop/ROADSTER devices such as depicted in schematic 450 may be programmed at installation or subsequently when that leaf switch 420 or other are provisioned. Equally, the characteristics may be varied during operation of the leaf-spine interconnection as depicted within FIG. 4 electronically without requiring the modification of any fiber optic infrastructure or service personnel to access the rack or bay of servers etc.

Within an embodiment of the invention using the ITU C-band grid spacing at 100 GHz and designing the system for WDM at 40 different wavelengths, e.g. channels 21 to 60, within the C-band wavelength range around 1550 nm as specified by the International Telecom Union (ITU). By combining 4 C-band channels at 25 Gbps in a CPPI-4 format, the full bandwidth per sub-band will be 100 Gbps at each node. Accordingly, each leaf switch 420 may access/provide up to 100 Gbps and the spine switch 410 may receive/transmit up to 1 Tbps as using this full 40 channel spectrum in the C-band it is possible to daisy chained up to 10 leaf nodes, and hence leaf switches 420, such as depicted in FIG. 4. This can be achieved using a single ROADSTER transceiver and a single fiber strand and still provide 100 Gbps of bandwidth between two nodes.

Each transceiver position in the leaf is able to drop a 4 wavelength sub-band communication channel from any other leaf that need to communicate with it. The selected wavelength is instantiated using a controller that keeps track of which wavelengths are used by which leaf switch 420, and hence it's associated leaf node. The reception tuning capacity of the ROADSTER approach allows also the establishment of one to many node multicast network communications. A transmitted wavelength for multicasting is picked by the broadcasting node and those nodes wishing to receive its broadcast tune their reception wavelength to the specified sub-band channel. Whilst this broadcast is performed other nodes can still communicate to each other using different wavelengths using unicast or multicast traffic.

Figure 5:
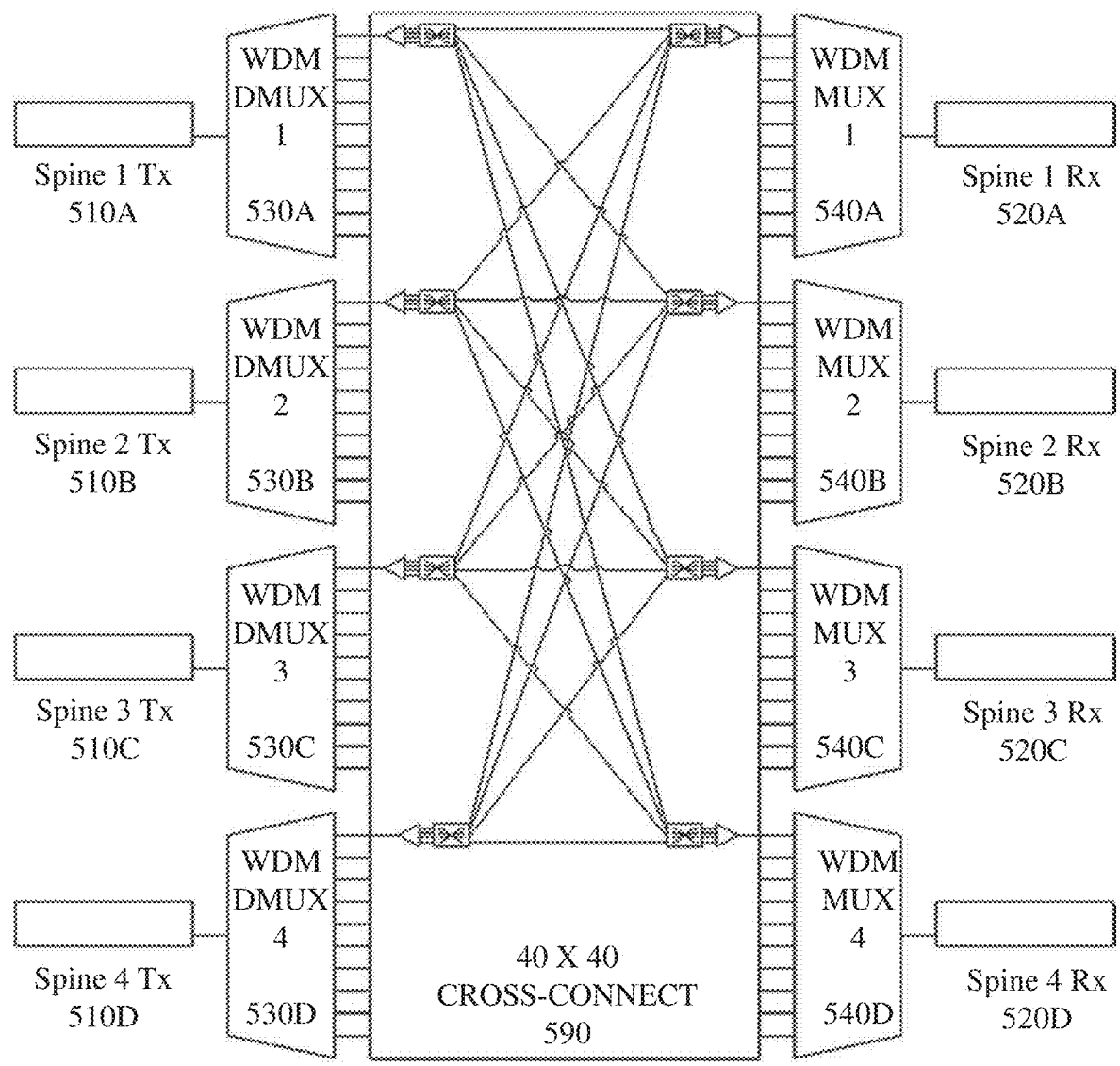
FIG. 5 depicts an interconnection diagram for multiple leaf switch rings according to an embodiment of the invention.

Then as depicted in FIG. 5 an interconnection diagram 500 for multiple leaf switch rings of ROADSTER nodes, not shown for clarity, via the spine switches 410. The spine switch 410 is unnecessary unless more than 10 node-to-node simultaneous communications are required on a single ROADSTER transceiver per leaf deployment. As depicted each spine switch 410 comprises a spine transmitter (Tx) 510X (X=A, B, C, D) coupled to one side of an optical cross-connect (OXC) 550 and spine receivers (Rx) 520X coupled to the other side of the OXC 550. The spine Tx 510X are demultiplexed by WDM DMUX 530X and optically routed signals from the OXC 550 are coupled to the spine Rx 520X via WDM MUX 540X. Accordingly, an incoming sub-band can be selected from any of the leaf-spine rings and coupled to the same or another leaf-spine ring exploiting the ROADSTER devices. According to the design of the 40×40 colorless, directionless, and contentionless (CDC) OXC (10 sub-bands on 4 leaf-spine rings) point to point routing may be implemented or multicast and point-to-point may be supported within the same fabric.

Figure 6:
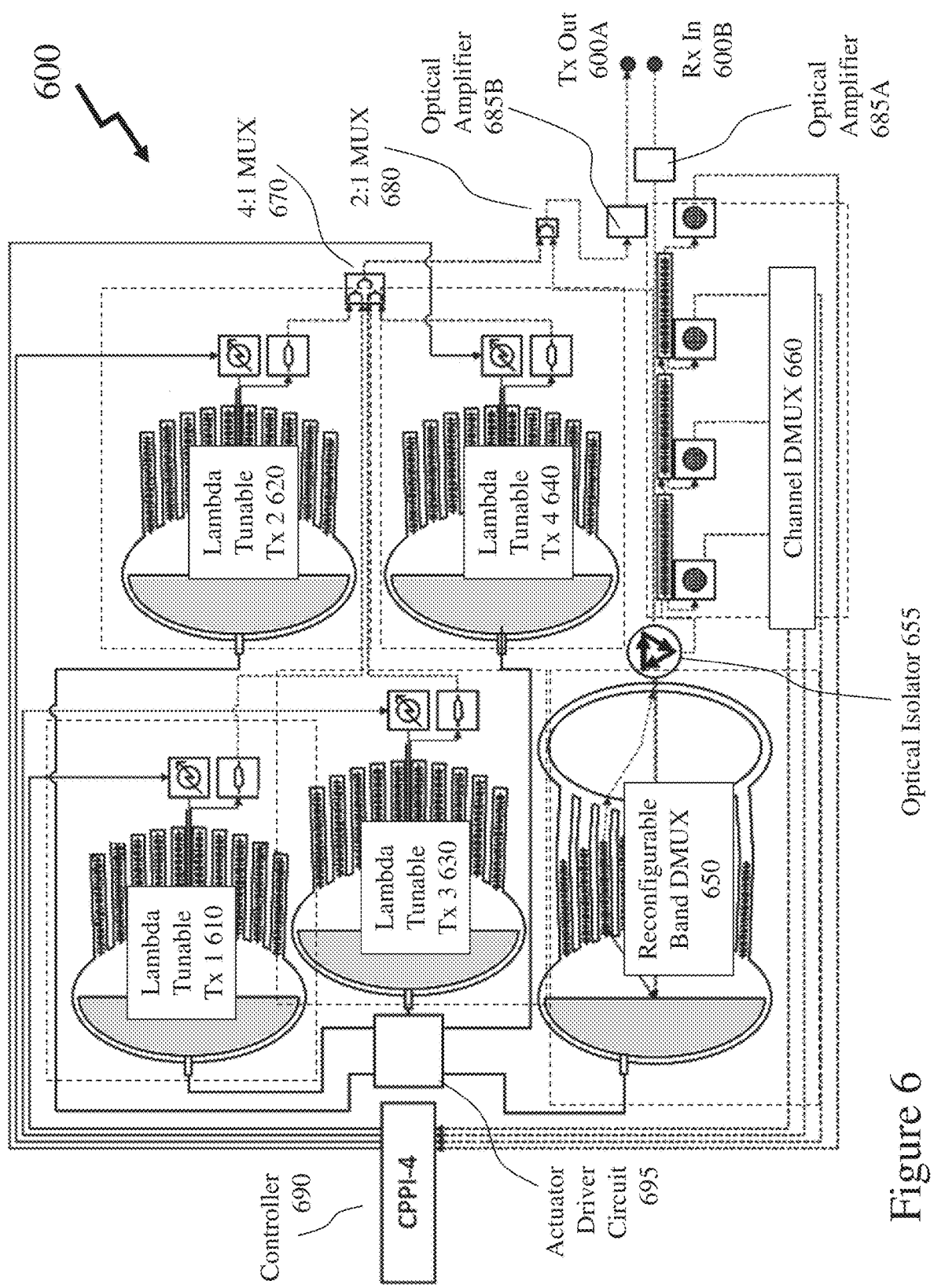
FIG. 6 depicts a reconfigurable add-drop multiplexer (ROADM) exploiting MEMS based wavelength tunable devices according to an embodiment of the invention.

Now referring to FIG. 6 there is depicted an architecture of a 4-channel ROADSTER 600 according to an embodiment of the invention exploiting MOTUS optical engines for the extraction of 4 wavelengths, in this embodiment, of a predefined sub-band and reinsertion of the same wavelengths with newly generated signals on the optical medium. When the full optical band of signals is received at the ROADSTER 600 (Rx) at Rx In port 600B the signals are coupled initially via a first Optical Amplifier 685A and an optical isolator 655 to a MOTUS based Reconfigurable Band DMUX 650 which tunes to a selectable sub-band filter and accomplishes two distinct operations. First, the selected sub-band is dropped and secondly, the remaining channels are coupled to 2:1 MUX 680 via the optical isolator 655 and therein recoupled to the network via Tx Out port 600A. The selected sub-band is coupled via the optical isolator 655 to a Channel DMUX 660 wherein the discrete wavelengths in the sub-band are separated and coupled to 4 photodetectors (PDs) devices thus extracting the modulated optical signals into an electrical quadruple communication port programming interface (CPPI-4) at the host level within controller 690.

Also depicted are four MOTUS based Lambda Tunable transmitters Tx1 610 to Lambda Tunable transmitter Tx4 640 respectively which are used to generate the new optical signals within the dropped sub-band for re-insertion into the network. The electrical CPPI-4 sub-band signal from a host is modulated to the right wavelengths on each MOTUS based Lambda Tunable transmitters Tx1 610 to Lambda Tunable transmitter Tx4 640 respectively. Each of the Lambda Tunable transmitters Tx1 610 to Lambda Tunable transmitter Tx4 640 respectively has 10 programmable wavelengths of operation such that the 10 sub-bands are supported by the appropriate selection of the distributed brag reflector (DBR), e.g. Bragg grating, within the MOTUS optical engine. Accordingly, the Actuator Driver Circuit 695 aligns the silicon MEMS mirrors within the four transmitting MOTUS optical engines to the desired sub-band. Accordingly, the tunable source comprising either a wideband laser in combination with the MOTUS optical engine or an optical gain block within a resonant cavity with the MOTUS optical engine provides the appropriate wavelength from the selected sub-band which is then coupled to an external modulator within each of the Lambda Tunable transmitters Tx1 610 to Lambda Tunable transmitter Tx4 640 respectively. The optical signals are then coupled to 4:1 MUX such that at this stage the four newly generated signals are combined together to generate the new sub-band. Subsequently, and then in 2:1 MUX 680 this new sub-band is are coupled to the remaining passed-through (non-selected) sub-bands and then amplified with second Optical Amplifier 685B before re-launch into the optical network.

Optionally, another ROADSTER mode of operation would be to pass-through all sub-bands directly from the Rx In port 600B to the Tx Out port 600A via the Optical Amplifier such that no wavelength would be dropped and no new signal would be inserted. In this scenario ROADSTER is use as an in-line amplifier only and hence may be employed within an initially deployed leaf-spine ring prior to the population of the leaf node with server connections. As soon as a server connections are made to the leaf node containing the leaf switch then the leaf-spine ring network is advised of the traffic and the ROADSTER 600 is configured. It would be evident that other configurations of the ROADSTER 600 may be employed in networks according to embodiments of the invention such as providing for a 40-channel C-band ring in an East-West direction and a 40-channel C-band ring in a West-East direction allowing loop-back configuration in the event of a physical infrastructure failure. Alternatively, the East-West and/or West-East ring may be operating at L-band (1565 nm 1625 nm) rather than the C-band (1530 nm≤λ≤1565 nm). In other embodiments other wavelength bands such as O-band (1260 nm≤λ≤1360 nm), E-band (1360 nm≤λ≤1460 nm), S-band (1460 nm≤λ≤1530 nm) and U-band (1625 nm≤λ≤1675 nm) may also be employed, for example.

Optionally the Optical Amplifier 685 may be placed on the receive side prior to the Reconfigurable Band DMUX 650 or amplification may be provided on both the receiving and the transmitting sides, e.g. an optical amplifier may be provided on the transmit side with another lower gain amplifier on the selected band demultiplexed prior to Channel DMUX 660. In embodiments of the invention with quantum dot semiconductor optical amplifiers (QD-SOA) placed on the receive side provide a smarter amplification process that may be employed for keeping the amplification linear and overcoming saturation.

An example of the channel wavelength plan for a C-band leaf-spine ring and accordingly the sub-band wavelengths for each of the Lambda Tunable transmitters Tx1 610 to Lambda Tunable transmitter Tx4 640 respectively λ1, λ2, λ3, λ4, and the 4 channel receiver within the Channel DMUX 660, λ1, λ2, λ3, λ4, is given in Table 1 below.

TABLE 1

Wavelength Allocation Plan according to an Embodiment of the Invention (C-Band Channel Numbers)

| | A | B | C | D | E | F | G | H | I | J |
|---|---|---|---|---|---|---|---|---|---|---|
| λ1 | 21 | 25 | 29 | 33 | 37 | 41 | 45 | 49 | 53 | 57 |
| λ2 | 22 | 26 | 30 | 34 | 38 | 42 | 46 | 50 | 54 | 58 |
| λ3 | 23 | 27 | 31 | 35 | 39 | 43 | 47 | 51 | 55 | 59 |
| λ4 | 24 | 28 | 32 | 36 | 40 | 44 | 48 | 52 | 56 | 60 |

By daisy-chaining multiple ROADSTERs in a ring topology, multiple ROADSTERs can be installed in a spine switch facing the east side of the ring in transmit mode and multiple ROADSTERS can be facing the west side of the ring in receive mode. Since in a Leaf Spine Topology, leaf-to-leaf communications is always through a Spine, this ensures a Leaf Spine topology enforcement while enabling single fiber operation, allowing for all communications to occur in the DWDM C-band without needing to use the L band in the reverse direction on the same fiber. Essentially, the network becomes a forward only ring with datacom originating from the Spine dropped along the way to multiple leaves, with signals being re-inserted on the ring by the leaves such as to send data back to the spine by reusing the same wavelength for establishing a unicast communication channel e.g. the same transmit and received sub-band are tuned by both leaf switches.

Figure 21:
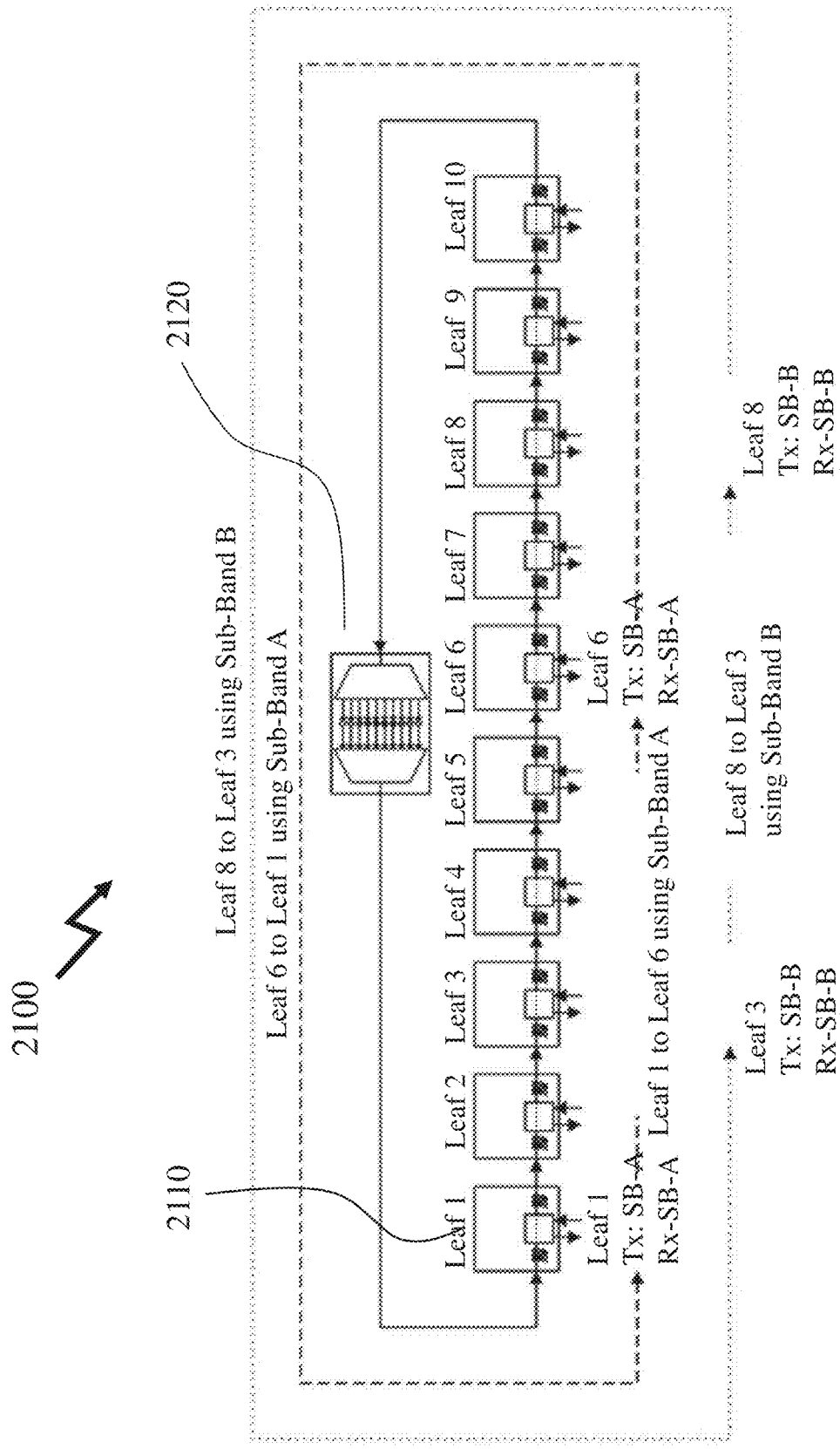
FIG. 21 depicts a sub-band reuse plan for unicast communication going from leaf to spine between two leaves within a leaf-spine network such as depicted in FIG. 4 according to an embodiment of the invention.

FIG. 21 depicts such an architecture allowing sub-band reuse for unicast communication going from leaf node 2110 to spine node 2120 between two leaf nodes 2110 within a leaf-spine network 2100 such as depicted and described supra in respect of FIG. 4 and WDM ring network 400. As depicted the ring comprises first to tenth leaf nodes 2110, identified as Leaf1, Leaf2, . . . , Leaf10. Accordingly, Leaf1 exploits sub-band A (SB-A) for transmit and receive such that if Leaf6 also tunes to SB-A then it will receive the optical signals from Leaf1 and transmit on SB-A as well thereby re-using the wavelengths within SB-A. Similarly, Leaf8 exploits sub-band B (SB-B) for transmit and receive such that if Leaf3 also tunes to SB-B then it will receive the optical signals from Leaf8 and transmit on SB-B as well thereby re-using the wavelengths within SB-B. Absent any routing within the spline node 2120 the transmitted signals from each of Leaf6 and Leaf8 will wrap around to Leaf1 and Leaf3 respectively unless another preceding node is tuned to their respective sub-bands.

Initially, it may appear confusing to see direct communication between Leaf1 and Leaf6 for example as this appears to break the rule of a leaf-spine topology by using a leaf node to leaf node direct communication but the duality of the communications involved between the two leaf nodes still need to go via the spine 2120 as Leaf6 sends its reply back to Leaf1 through the spine 2120. Since the sub-band is reused, only half the communication bandwidth is going through the spine thereby allowing for a doubling in the total bandwidth capacity communication occurs between two leaf nodes within the same ring.

Figure 22:
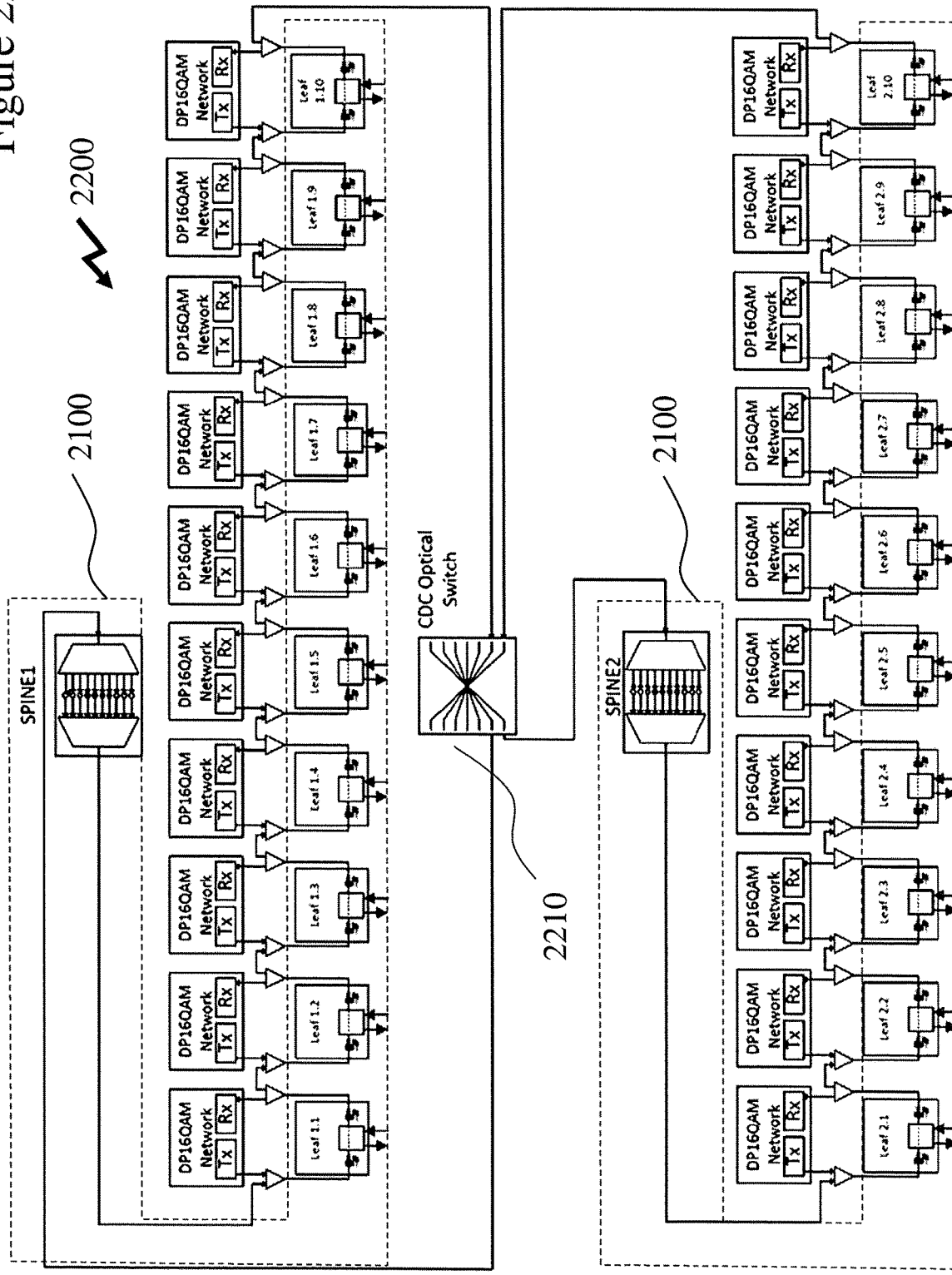
FIG. 22 depicts an interconnection diagram for two Reconfigurable Optical Add/Drop Switch Transceiver with Electronic Regeneration (ROADSTER) network rings using a contention less, direction less, colorless optical switch whilst providing filter less and colorless SOA overlay amplification to a DP-16QAM network via the pass-through functionality of the polarization less SOA included in ROADSTER according to an embodiment of the invention.
Figure 23:
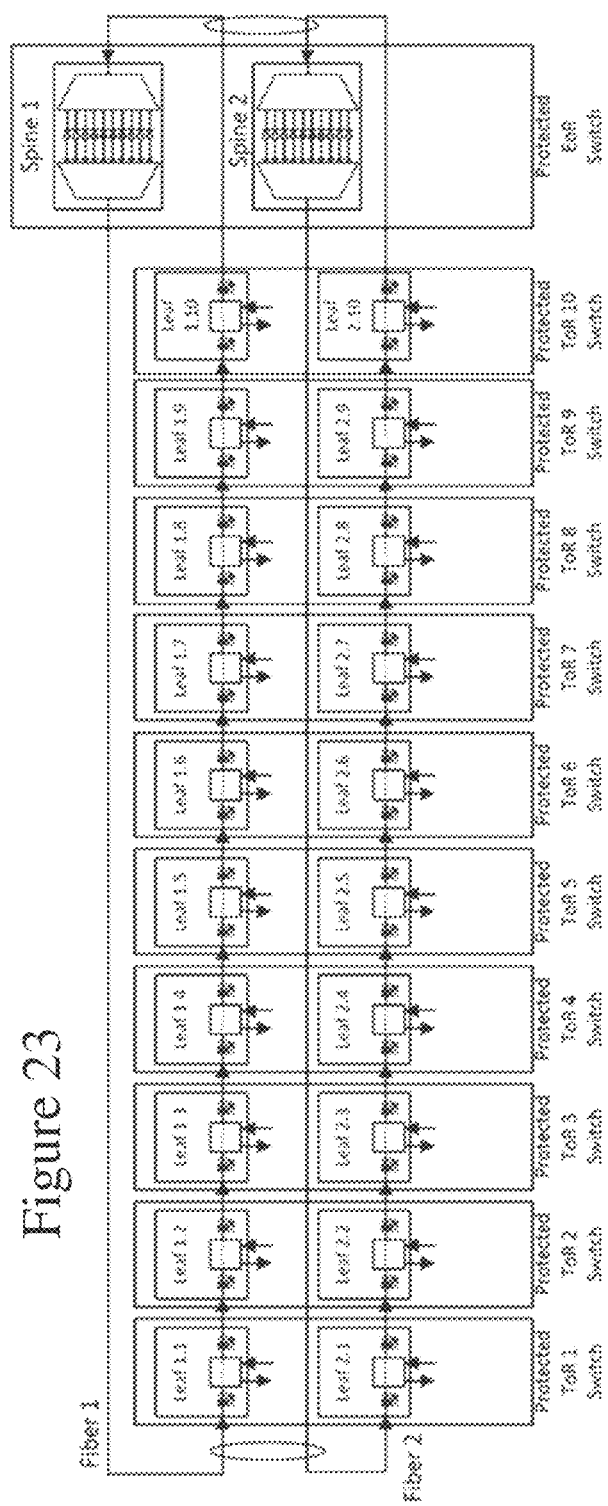
FIG. 23 depicts a protected leaf spine on the same ring by using two different fiber in two independent ROADSTER network ring according to an embodiment of the invention.
Figure 24:
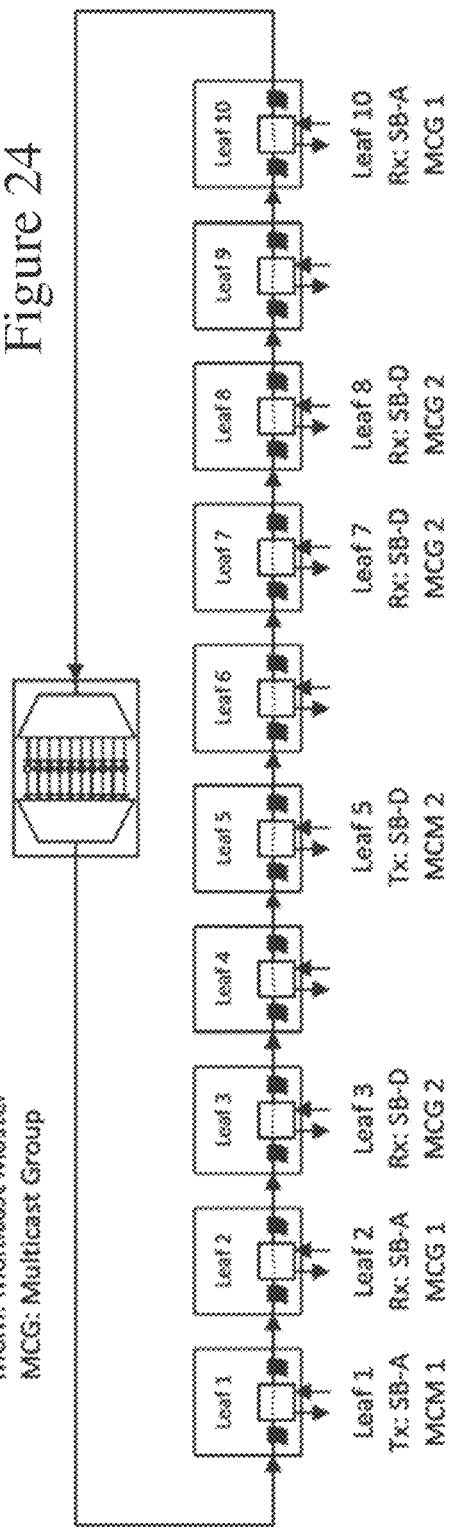
FIG. 24 depicts a multicast scenario for a leaf-spine network such as depicted in FIG. 4 according to an embodiment of the invention.

Referring to FIG. 22 there is depicted an interconnection diagram 2200 for two ROADSTER network rings 2100 using a contention less, direction less, colorless optical switch 2210 whilst providing filter-less and colorless SOA overlay amplification to a dual-polarization 16ary quadrature amplitude modulation (DP-16QAM) network via the pass-through functionality of the polarization less SOA within each ROADSTER. Also referring to FIG. 23 there is depicted a protected leaf-spine network on the same ring using two different optical fibers in two independent ROADSTER network rings each comprising a spine node and ten leaf nodes as depicted in FIG. 23 and as discussed supra in respect of FIGS. 4 and 21. Further referring to FIG. 24 there is depicted a multicast scenario for a leaf-spine network such as depicted in FIG. 4 according to an embodiment of the invention wherein some leaf nodes are multicast master nodes providing the wavelength(s) for multicasting and other leaf nodes are part of a multicast group associated with a multicast master such that they receive the wavelength(s) multicast by the multicast master node for that multicast group.

Figure 7:
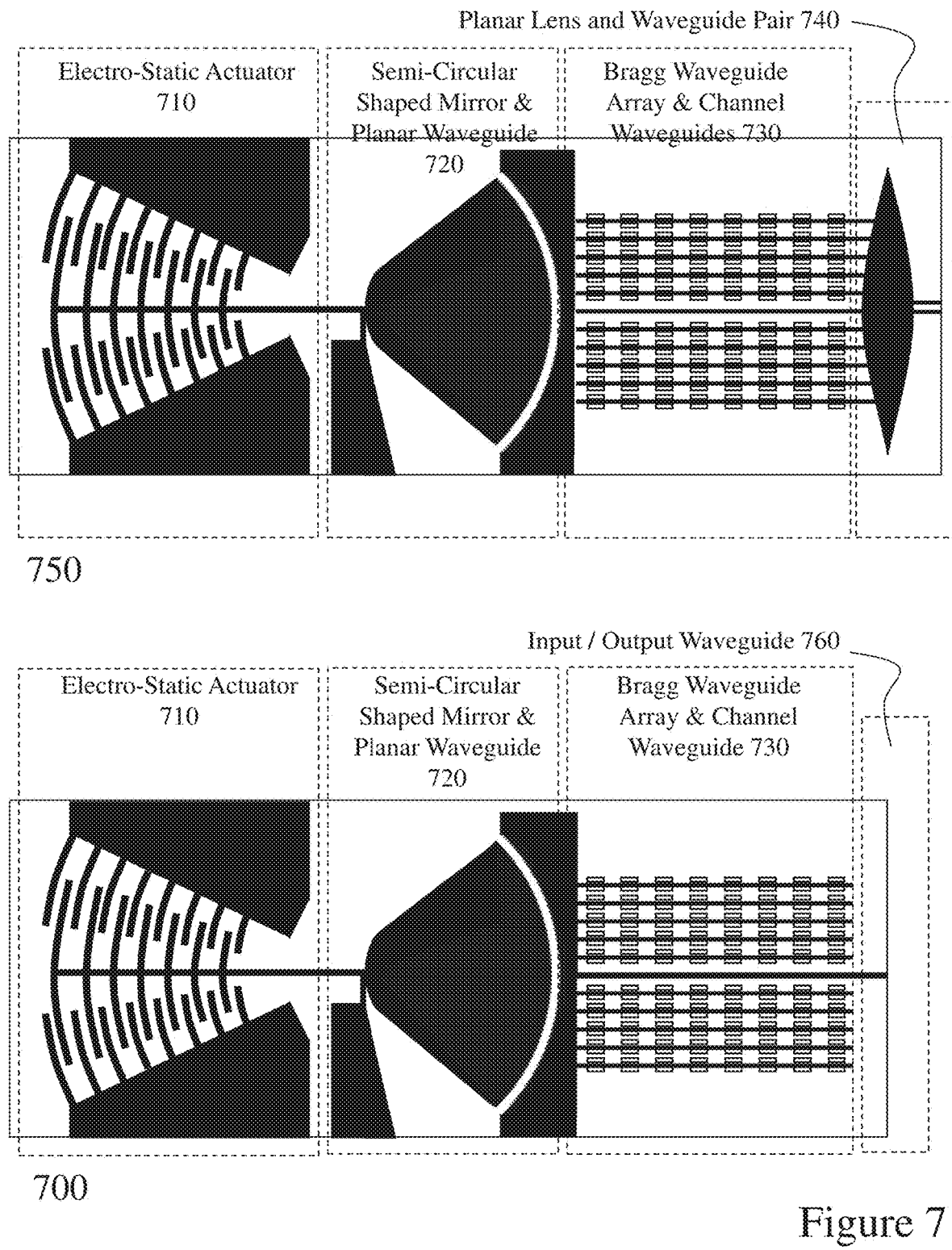
FIG. 7 depicts wavelength settable optical components exploiting MEMS mirror elements in conjunction with wavelength selective reflecting elements.

Referring to FIG. 7 there are depicted schematics of first and second MOTUS optical engines 700 and 750 respectively which form part of the wavelength programmable transmitters, e.g. each of the Lambda Tunable transmitters Tx1 610 to Lambda Tunable transmitter Tx4 640 respectively, and the Reconfigurable Band DMUX 650. Details of the first and second MOTUS optical engines 700 and 750 can be found within a US Provisional Patent Application by Provisional Patent Application 61/949,484 filed Mar. 7, 2014 by Francois Menard, Frederic Nabki, Michael Ménard, and Martin Bérard entitled "Methods and System for Wavelength Tunable Optical Components and Sub-Systems" and the associated Patent Cooperation Treaty filed Mar. 9, 2015 entitled "Methods and System for Wavelength Tunable Optical Components and Sub-Systems" in which the inventors describe silicon microoptoelectromechanical systems (MOEMS) and silicon photonic circuits to provide the switching functionality within a transmitter, receiver, ROADM, etc. An overview of silicon MEMS, MOEMS and silicon photonics can also be found within U.S. Provisional Patent Application 61/925,290 entitled "Mirror Based Microelectromechanical Systems and Methods" by 'Frederic Nabki et al. and its associated Patent Cooperation Treaty PCT/CA2015/000007 filed Jan. 7, 2015 entitled "Mirror Based Microelectromechanical Systems and Methods."

As depicted first MOTUS optical engine 700 comprises an input/output waveguide 760 that couples through Bragg Waveguide Array & Channel Waveguides 730 to the semi-circular mirror via a planar waveguide in Semi-Circular Shaped Mirror & Planar Waveguide 720. According, the optical signal from the input/output waveguide 760 is reflected and coupled to one of the distributed Bragg reflectors (DBRs) within the Bragg Waveguide Array & Channel Waveguides 750. The optical signals reflected from the selected DBR within the Bragg Waveguide Array & Channel Waveguides 750 are then reflected back through the Semi-Circular Shaped Mirror & Planar Waveguide 720 to the input/output waveguide 760. Accordingly, a wideband optical signal is filtered by the appropriately selected DBR within the Bragg Waveguide Array & Channel Waveguides 750 or a cavity formed comprising the selected DBR within the Bragg Waveguide Array & Channel Waveguides 750 and an external optical gain medium with a broadband reflector may become a wavelength settable laser source.

Now referring to second MOTUS optical engine 700 then this similarly comprises an input/output waveguide within the Planar Lens and Waveguide Pair 740 which couples through Bragg Waveguide Array & Channel Waveguides 730 to the semi-circular mirror via a planar waveguide in Semi-Circular Shaped Mirror & Planar Waveguide 720. According, the optical signal from the input/output waveguide 760 is reflected and coupled to one of the distributed Bragg reflectors (DBRs) within the Bragg Waveguide Array & Channel Waveguides 750. The optical signals reflected from the selected DBR within the Bragg Waveguide Array & Channel Waveguides 750 are then reflected back through the Semi-Circular Shaped Mirror & Planar Waveguide 720 to the input/output waveguide 760. Accordingly, a wideband optical signal is filtered by the appropriately selected DBR within the Bragg Waveguide Array & Channel Waveguides 750. However, in contrast to first MOTUS optical engine 700 rather than signals within the optical signal coupled to the MOTUS optical engine that are not reflected by the selected DBR within the Bragg Waveguide Array and Channel Waveguides 730 being lost these propagate through into the Planar Lens and Waveguide Pair 740 wherein a planar lens focusses these optical signals to a second channel waveguide within the Planar Lens and Waveguide Pair 740. Accordingly, the reflected signals from the DBR are the selected sub-band which are then coupled to the Channel DMUX 660 whilst the optical signals passed through are coupled to the waveguide and out from the second MOTUS optical engine 750 and therein coupled to the 2:1 MUX 680.

Figure 8:
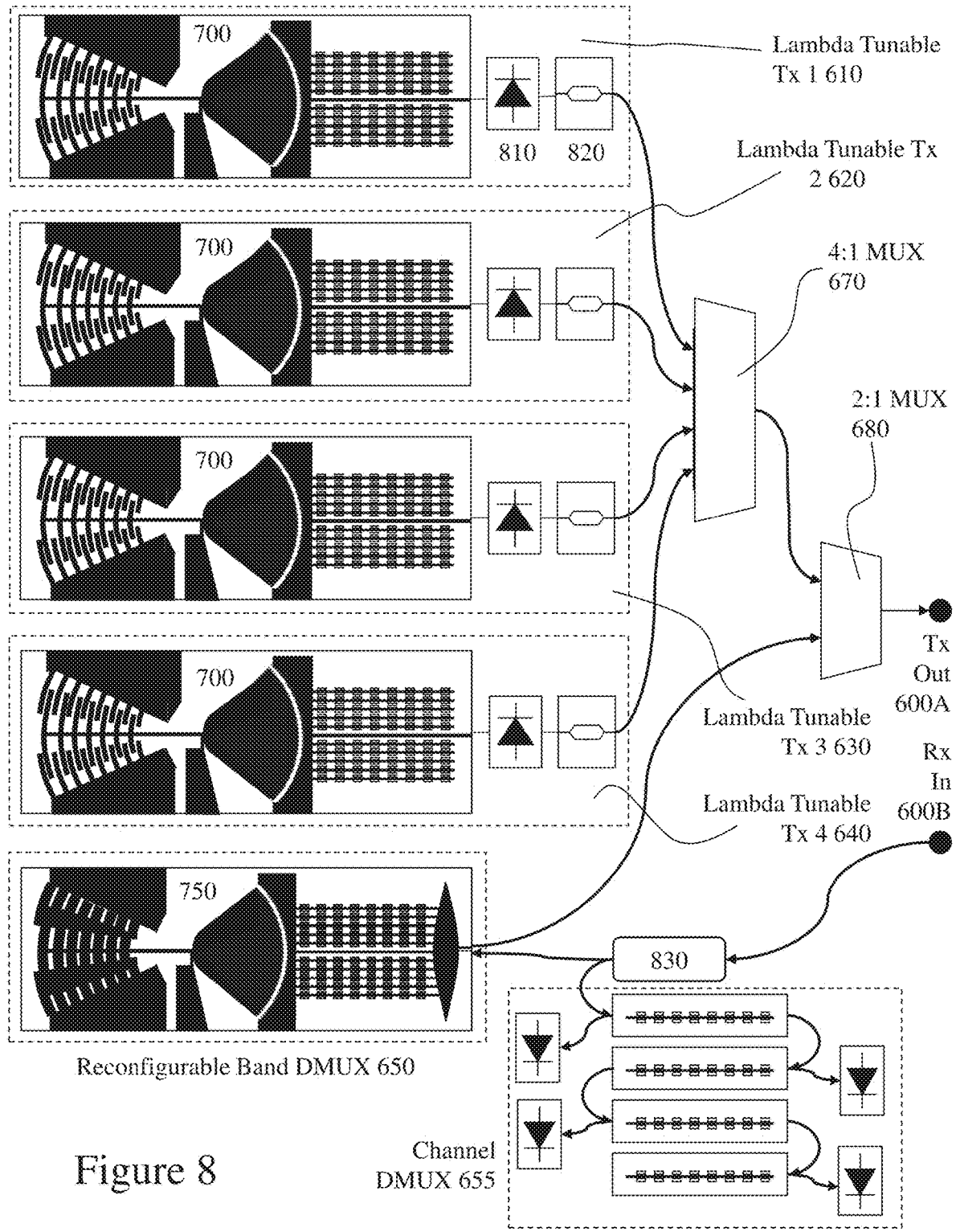
FIG. 8 depicts the ROADM according to the architecture of FIG. 6 implemented using the wavelength settable optical components depicted in FIG. 7.

Accordingly, referring to FIG. 8 there is depicted a schematic of 4-channel ROADSTER 600 as described supra in respect of FIG. 6 exploiting first and second MOTUS optical engines 700 and 750 respectively. Accordingly, there are depicted Lambda Tunable transmitters Tx1 610 to Lambda Tunable transmitter Tx4 640 respectively which exploit the first MOTUS optical engine 700 in conjunction with an optical gain element 810 and external modulator 820. The outputs of these couple via 4:1 MUX 670 to 2:1 MUX 680 and therein to the Tx Out port 600A. The Rx In 600B signals are coupled to the Reconfigurable Band DMUX 650 via circulator 830, the Reconfigurable Band DMUX 650 comprising second MOTUS optical engine 750 wherein the selected sub-band is coupled back to the circulator 830 and therein to the Channel DMUX 660. The passed-through sub-bands are coupled to the 2:1 MUX 680 and therein to the Tx Out port 600. Any optical amplification within the ROADSTER 600 has been omitted for clarity.

As depicted the Channel DMUX 660 is an array of Bragg grating devices, such as grating assisted reflective directional couplers or grating assisted transmissive directional couplers for example in order to remove the requirement for isolators to separate reflected optical signals from the forward propagating signals. The Bragg grating devices may be cyclic, low free spectral range, geometries such that one Channel DMUX 660 operates on all bands.

2: Gridless Wavelength Dependent Add/Drop with Wavelength/Spectral Re-Use

A new generation of optoelectronics equipment with integrated wavelength division multiplexing capabilities and targeted at datacenter fabrics is now emerging. As depicted supra in respect of FIGS. 4 and 5 leaf-spine interconnection can be mapped to a single optical fiber with 40 channels at 25 Gbps. Within the prior art a switch vendor has recently implemented a 10 Gbps ToR switch that makes use of 2 channels of CWDM on fibers within a 12-count multi-fiber chordal ring to implement a 2:1 oversubscribed 240 Gbps ring topology for rings up to 10 km made up of up to 11 switches.

However, the inventors have established that with WDM-PON technology, the same chordal ring topology would be capable of 10× as many channels and of much greater distances. Further, the inventors have established an approach to enabling multi-degree interconnection through dense WDM (DWDM), e.g. 100 GHz channel spacing, which reduces the number of fiber optic links by passively establishing multipoint connectivity through optical wavelengths. In a datacenter environment, DWDM technology can therefore be leveraged to extend spine switches all the way to the computing nodes, foregoing the need for ToR switches.

The inventors have established that a non-blocking any-to-any connectivity with latencies only made possible by full mesh connectivity down at the physical layer becomes possible with DWDM Technology, while keeping the number of links as a linear function of the number of interconnected nodes. Within the prior art WDM devices such as 80 channel 50 GHz spacing cyclic C+L a thermal arrayed waveguide gratings allow the multiplexing of 80 C-band and 80 L-band channels to provide DWDM based transport of 160 individual wavelengths, 80 East and 80 West, on a single strand of single mode optical fiber. With conventional modulation and direct detection at 25 Gbps per wavelength, each channel of 100 Gbps would require 8 wavelengths (4 in the DWDM L band, 4 in the DWDM C band). Thus, it is possible to transport (160/8)=20 channels of 100 Gbps onto a single fiber, which equates to 2 Tbps on a single fiber.

Subsequently, without any change to the fiber optic and WDM-PON multiplexers, the same passive infrastructure will be able to support 80 channels of 100 Gbps, or 8 Tbps on a single strand of single mode optical fiber, with higher order modulations and coherent reception. With today's WDM therefore every link can support n channels through multiple wavelengths where n can be up to 88 full duplex channels. Consequently, the number of wavelength paths in a protected mesh topology built over a WDM layer would remain on the order of $2n^2$, but the number of physical links would be exponentially reduced down to $2*n$ which is substantially lower than the $2n^2$ within the protected mesh topology.

Figure 9:
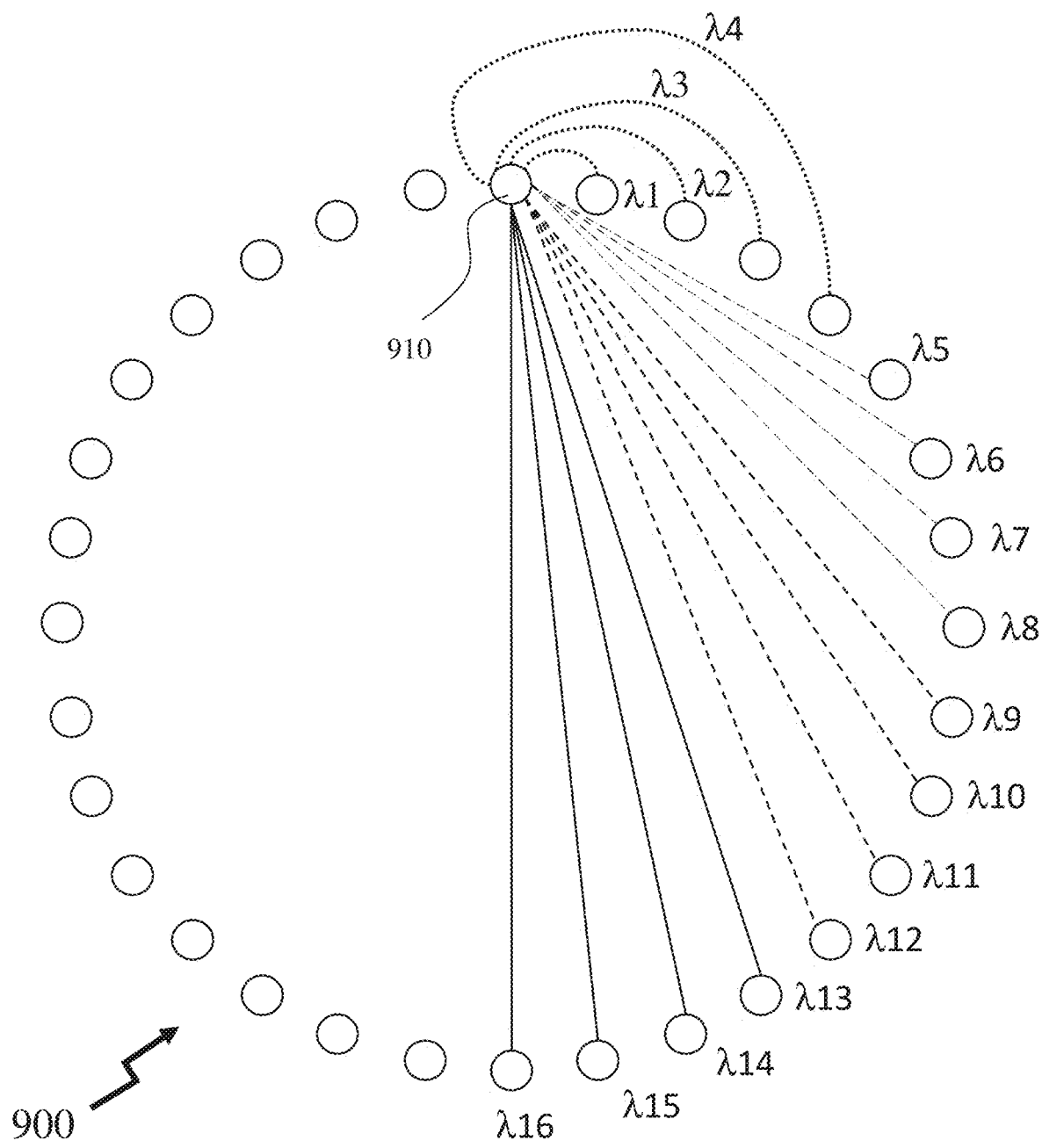
FIG. 9 depicts a chordal interconnection pattern for a single node within a ring network according to an embodiment of the invention.
Figure 10:
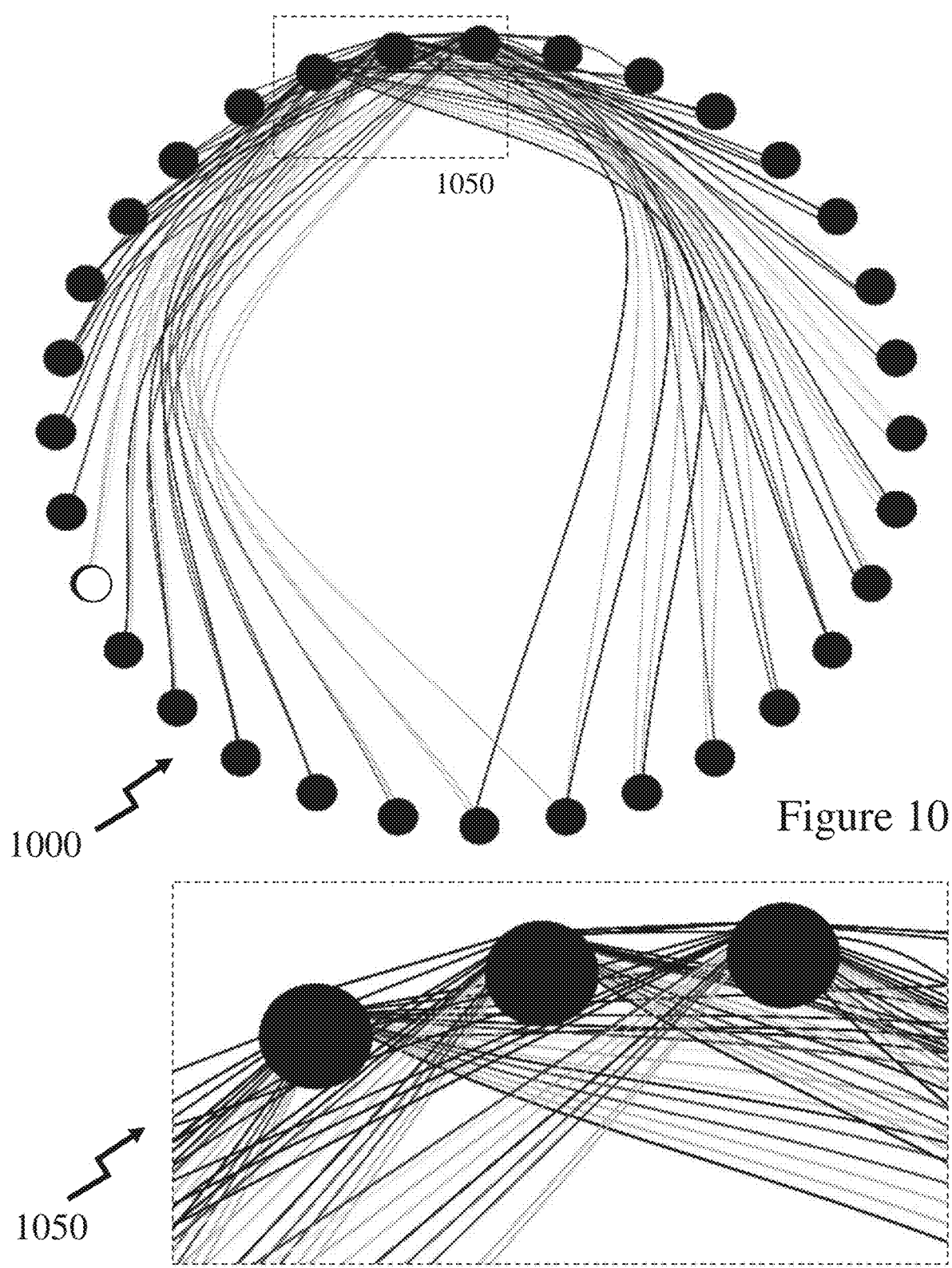
FIG. 10 depicts a chordal interconnection pattern for a ring network according to an embodiment of the invention with multiple nodes populated.

As depicted in FIG. 9 wherein only a portion of the deployed chordal DWDM is depicted for a node 910 within a network 900 wherein each subsequent node within the network is connected to the node 910 via a specific wavelength, e.g. the first node by $\lambda 1$, the second node away by $\lambda 2$, etc. and then the sixteenth node by $\lambda 16$ for example, etc. Accordingly, for a 32 node WDM choral ring according to an embodiment of the invention a partial view of the interconnections is depicted in FIG. 10 with first schematic 1000 and for three fully populated nodes in second schematic 1050.

It would be evident that in hyperscale datacenters such an architecture will translate to significant costs savings in the cabling infrastructure while at the same time providing the fully meshed topology necessary to scale out of HM clouds. Further, as WDM-PON technology is based on low-loss dense wavelength division multiplexers, WDM-PON links can thus be used to build highly resilient fault tolerant topologies that can span multiple datacenters in the same metropolitan market. Further, since DWDM technology operates in the portion of the fiber optic spectrum that can be amplified, using erbium doped optical amplifiers, the links can be tens to hundreds of kilometers such that the multiple datacenters can be connected across larger geographical distances directly without relying upon telecommunications network infrastructure of if designed and implemented in conjunction to telecommunications networks the wavelength signal(s) between geographically dispersed datacenters may be transported upon so-called "dark fiber" or be channels on a live fiber leased from a telecommunications network provider.

3. Intelligent WDM-PON Node with Remote Latching Mems and OTDR

Figure 11A:
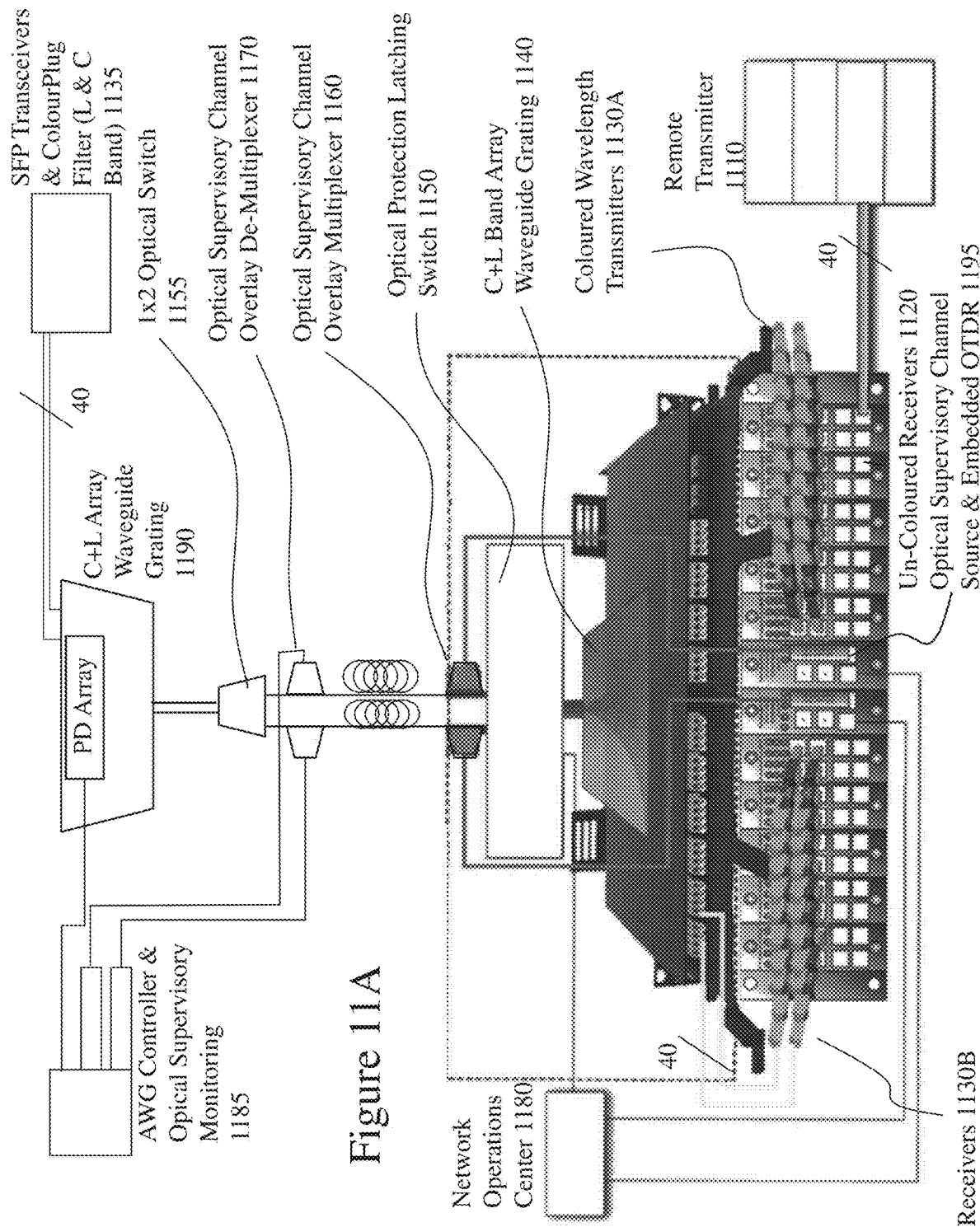
FIG. 11A depicts a remote note to central office interconnection exploiting embedded OTDR in conjunction with latching 1×2 protection switching.

Referring to FIG. 11A there is depicted a WDM node with a remote latching MEMS switch and optical time domain reflectometry (OTDR) link fault detection. As depicted the node comprises uncolored receivers 1120 which receive data from remote transmitters 1110, such as for example LTE base stations. These received signals are then applied, where they are to be transmitted from the WDM node, to coloured wavelength transmitters (e.g. C band or L band) 1130A which are coupled to C+L band AWG 1140. The output from the C+L band AWG 1140 are coupled via Optical Protection Latching Switch 1150 before an Optical Supervisory Channel (OSC) is overlaid through OSC overlay multiplexer 1650 and therein to the singlemode transmission network. At the remote node the OSC signal is extracted from the incoming WDM signal and coupled to AWG Controller and OSC Monitoring 1185. The C-band WDM signals are then coupled via an optical switch 1155 to a remote C+L AWG 1190 and the C-band signals routed to remote Small Form-Factor Pluggable (SFP) transceivers 1135 with Colour-Plug™ filter patchcords such as described below in respect of Section 4.

The output from the SFP transceiver 1135 in the L-band is coupled back to the C+L AWG 1190 wherein it is WDM multiplexed back to the optical switch 1155 and transmitted back to the node wherein the L-band WDM signals are demultiplexed by the C+L band AWG 1140 and coupled to Receivers 1130B. Accordingly, up to 40 channel 100 GHz duplex links or 80 50 GHz duplex links can be supported over a single optical fiber with C-band downstream transmission and L-band upstream transmission.

Additionally, the Optical Protection Latching Switch 1150 and optical switch 1155 are coupled to a second optical fiber that routes between the node and remote node over a different geographic path. Optical supervisory overlay is also provided on this second optical fiber again from the node. The OSC-Embedded OTDR sources 1195 also include embedded OTDR functionality together with the OSC signal. Accordingly, failure to detect an OSC signal at the node on the primary fiber is indicative of a failure such that the optical switch connects to the second fiber. Such a failure would also be detected by the embedded OTDR within the OSC source thereby triggering a switching of the optical protecting latching switch 1150 which then latches into the new state. The optical protecting latching switch 1150 and the pair of OSC-Embedded OTDR sources 1195 are coupled to Network Operations Center 1180. Accordingly, high channel count duplex transmission can be supported between a node and a remote node with automatic failover protection through optical supervisory channel and embedded ODTR functionality.

Figure 11B:
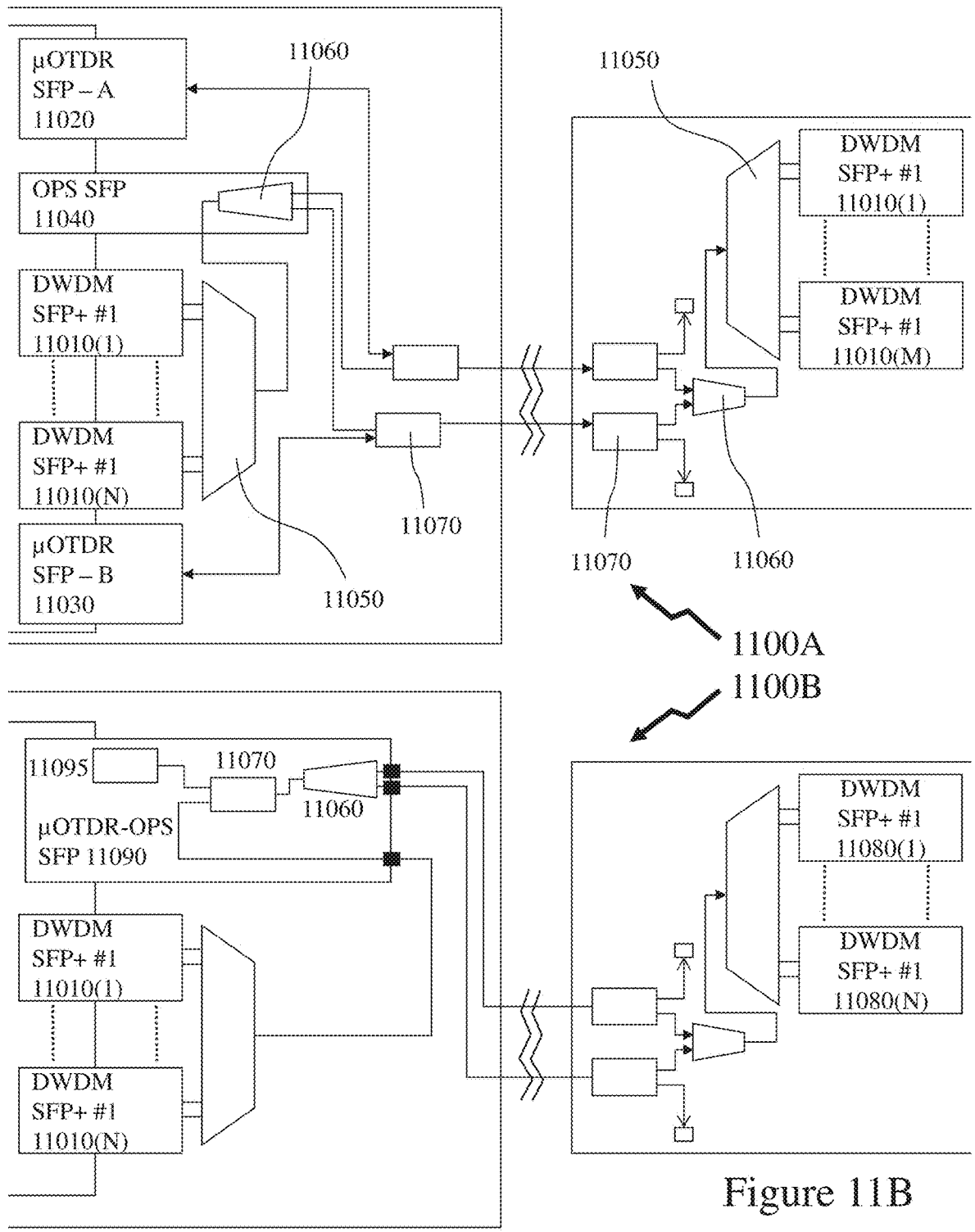
FIG. 11B depicts OTDR and latching 1×2 MEMS protection switching exploiting SFP pluggable modules and out of band serial communications according to embodiments of the invention.

Now referring to FIG. 11B there are depicted first and second protection architectures 1100A and 1100B respectively employing micro-OTDR (µOTDR) and latching 1×2 MEMS protection switching exploiting SFP pluggable modules and out of band communications according to embodiments of the invention. In first protection architecture 1100A DWDM SFP+modules 11010(1) to 11010(N) are coupled to a DWDM 11050 and therein to 1×2 optical protection switch (OPS) 11060 within OPS SFP 11040. From the 1×2 OPS 11060 the outputs route to filter 11070 and then geographically diverse fibers to the remote node. The filters 11070 each couple the output of μOTDR SFPs 11020 and 11030 to the geographically diverse fibers. At the remote node other filters 11070 remove the out of band μOTDR signals from the DWDM signals. The active optical fiber is routed via an 1×2 OPS 11060 to DWDM 11050 and therein to DWDM SFP+modules 11010(1) to 11010(M) within the remote node. In the event of a fiber failure the μOTDR, e.g. μOTDR SFP 11020, detects a back reflection and trigger the 1×2 OPS 11060 within the node to switch the DWDM signals to the geographically diverse fiber. The 1×2 OPS 11060 within the remote node is switched based upon the μOTDR signal on the broken fiber not being detected. Each 1×2 OPS 11060 employs a latching 1×2 silicon MEMS optical switch.

Within second protection architecture 1100B the DWDM output is coupled to μOTDR-OPS SFP 11090 housing the μOTDR laser 11095, filter 11070, and 1×2 OPS 11060 such that the μOTDR-OPS SFP 11090 couples to the geographically diverse fibers. Accordingly first and second protection architectures 1100A and 1100B each provide SFP modules with embedded protection switching and out of band control interfaces. It would be evident to one skilled in the that the 1×2 OPS 11060 may provide connectorised interfaces for connecting the μOTDR-OPS SFP 11090 to the DWDM and the outputs of the 1×2 OPS 11060 to their optical links to remote node. Optionally, 1×2 OPS 11060 may be an 1×N OPS or a 2×N where N≥2 allowing another out-of-band communications signal to be added in parallel to or in replacement of the optical signals from μOTDR laser 11095.

4. L-Band/C-Band Patchcord with Embedded Silicon Optical Bench

Figure 12:
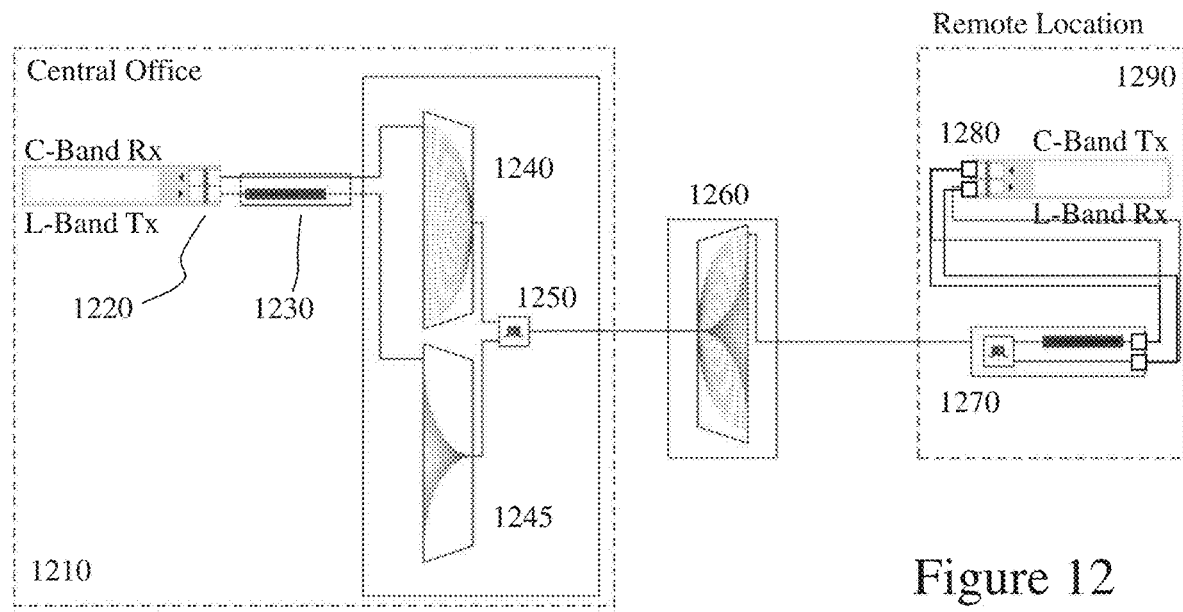
FIG. 12 depicts a central office to remote location interconnection using C+L bands wherein Bragg gratings embedded into connecting patchcords provided for coloured transmitters based upon colourless transceivers according to an embodiment of the invention.

Referring to FIG. 12 there is depicted a schematic of a bidirectional link between a first transceiver 1220 within a Central Office 1210 and a second transceiver 1280 within a Remote Location 1290. The first transceiver 1220 in this instance is L-band transmit/C-band receive and is coupled via a first patchcord 1230 to downstream MUX 1245 and upstream DMUX 1240 the single channel outputs from the downstream MUX 1245 and upstream DMUX 1240 are coupled via an L-C band coupler to C+L cyclic AWG 1260 over a fiber optic link. The output of a channel of the C+L cyclic AWG 1260 is coupled to second transceiver 1280 via second patchcord 1270. Second transceiver 1280 is a C-band transmit and L-band receive.

Figure 13:
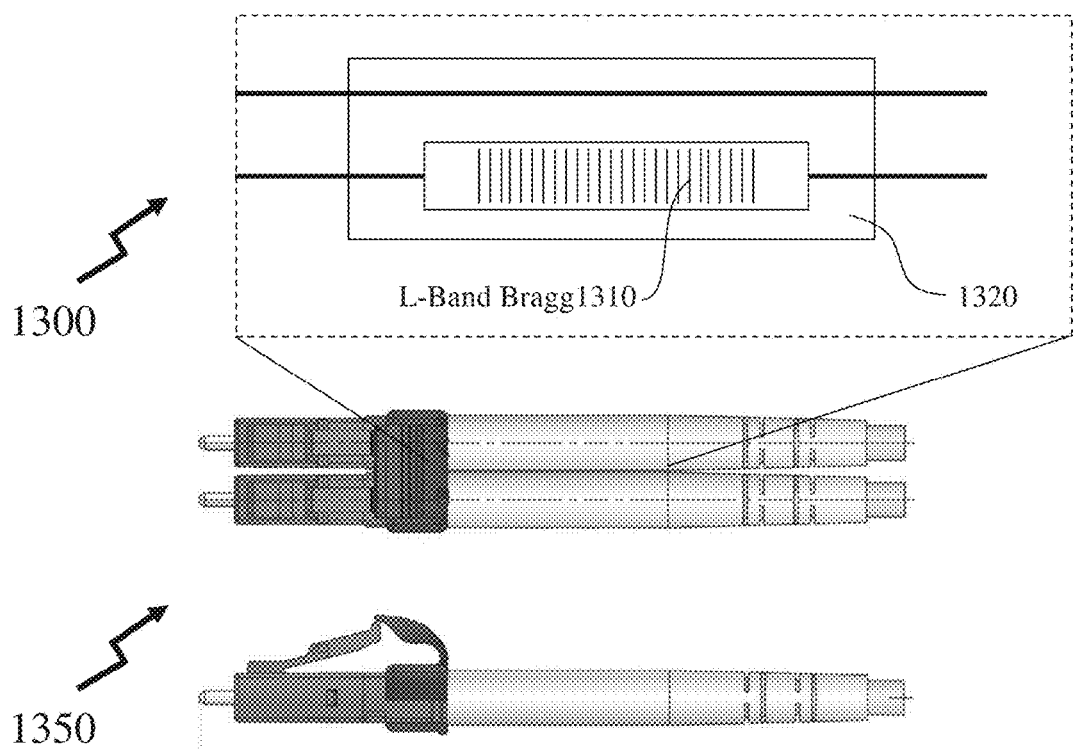
FIGS. 13 and 14 depict bidirectional link connectors with embedded Bragg gratings and/or C+L band filters according to embodiments of the invention.

An embodiment of the transceiver end of the first patchcord 1230 is depicted in FIG. 13 with internal partial schematic 1300 and external assembly 1350. Accordingly, a silicon optical circuit 1320 is depicted with two inputs and two outputs which forms part of the connector assembly. Disposed between the lower input and output is an L-band Bragg grating such that the colourless first transceiver 1220 is now coloured in the L-band. The C-band is a pass through as it has been coloured by the upstream DMUX 1240.

Figure 14:
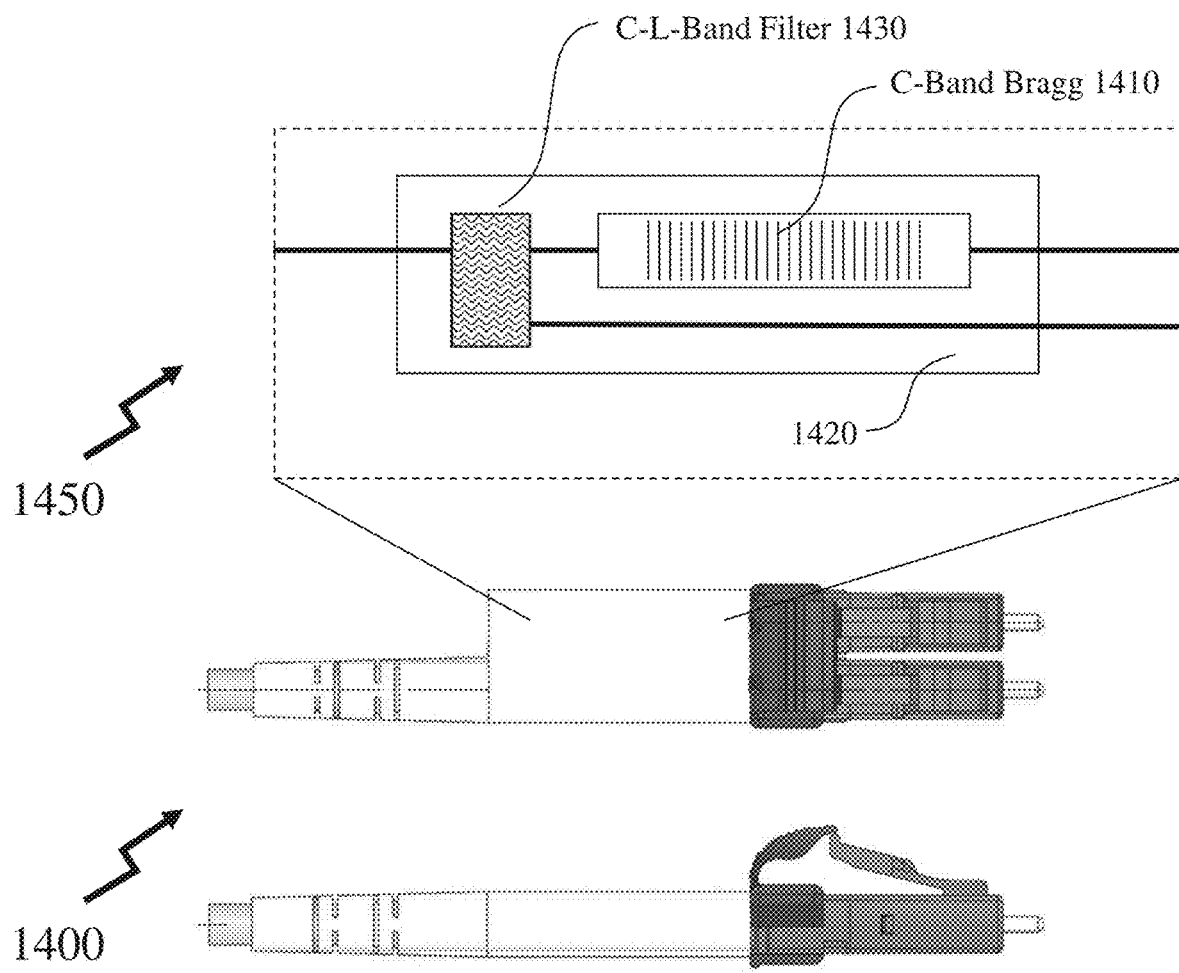

An embodiment of the transceiver end of the second patchcord 1270 is depicted in FIG. 14 with internal partial schematic 1400 and external assembly 1450. Accordingly, a silicon optical circuit 1420 is depicted with one input and two outputs which forms part of the connector assembly. The silicon optical circuit 1420 incorporates a C/L thin film filter (TFF) 1430 and a C-band Bragg grating 1410. Accordingly, when connected to the second transceiver 1280 the C-band Bragg grating turns the colourless C-band source into a coloured transmitter in the C-band. The C/L TFF 1430 provides the required C/L band separation for the second transceiver 1280 and single fiber connectivity to the C+L cyclic AWG 1260. The L-band is a pass through as it has been coloured by the C+L cyclic AWG 1260.

Optionally, the first patchcord 1230 may include a C/L TFF 1430 and only have a single optical pigtail. Additionally whilst the C/L TFF 1430 is depicted in internal partial schematic 1400 as splitting the C- and L-bands in the forward propagating direction it would be evident to one skilled in the art that in fact according to the design of the C/L TFF 1430 either the C- or L-band would be reflected and accordingly this is accommodated by folding/bending its optical path. To the user this aspect is hidden.

It would be evident that alternatively to the fiber Bragg gratings that single channel C and L and L band TFFs may be employed within silicon optical circuits or a micro-optic assembly to provide the same functionality. It would also be evident that the concept may be expanded to allow for C+L band separation, band filtering, and single channel filtering all within the same patchcord connector assembly wherein the connector assembly now supports perhaps 2 or more channels and the associated number of connections. Optionally, the assemblies such as described supra in respect of FIGS. 12 to 14 may be deployed within a housing within a patchcord or may form part of a discrete connector-receptacle housing such that this the connector end is inserted into the receptacle of a transceiver, e.g. an SFP or SFP+ transceiver, and then a standard patchcord is inserted into the receptacle.

5. Silicon MEMS Based Tunable Optical Transmitters, Receivers and Pluggable Transceivers Referring to FIG. 15A there is depicted a wavelength selective MOTUS 1550 optical engine according to an embodiment of the invention acting as the tuning element for a wavelength selective receiver 1500. Accordingly an input optical signal is coupled to an optical circulator 1510 wherein it is coupled to the MOTUS 1550. The reflected signal at the wavelength selected by tuning the SC-MEMSM within the MOTUS 1550 is then coupled back to the optical circulator 1510 and therein to the photodetector 1520. Whilst the optical circulator 1510 provides for separation of the input forward propagating signals and backward propagating signals these can be bulky and expensive devices. An alternate wavelength selective receiver 1500B wherein the wavelength selective MOTUS 1550 optical engine has been replaced with wavelength selective MOTUS 1560 wherein the mirror MOEMS element has been replaced with a beam 1540 upon which is disposed waveguide 1530 which couples to input/output optical waveguide 1570. Accordingly, activation of the MEMS actuator again pivots the MOEMS but now this is the beam 1540 with waveguide 1530 rather than the MOEMS with planar waveguide and mirror elements. The optical circulator 1510 and photodetector 1520 required to form the wavelength selective receiver 1500B with wavelength selective MOTUS 1560 have been omitted for clarity.

Accordingly, referring to FIG. 16A there is depicted a wavelength selective receiver (WSR) 1600 according to an embodiment of the invention exploiting a wavelength selective MOTUS optical engine with Bragg grating based transmissive Fabry-Perot filters and coupler combiners. Accordingly the SC-MEMSM mirror allows for selection of the appropriate Fabry-Perot filter 1640 within the array of Fabry-Perot filters. Each Fabry-Perot filter 1640 is comprised of first and second Bragg gratings 1630A and 1630B that act in conjunction with one another to provide a high finesse filter, see for example Legoubin et al in "Free Spectral Range Variations in Grating-Based Fabry-Perot Filters Photowritten in Optical Fibers" (J. Opt. Soc. Am. A, Vol. 12, No. 8, pp-1687-1694). The outputs of the upper and lower waveguide groups are each coupled to a multi-mode interferometer (MMI), first and second MMI 1610A and 1610B respectively, and therein to first and second photodetectors 1620A and 1620B.

Similarly, FIG. 16B depicts a selective receiver (WSR) 1650 according to an embodiment of the invention exploiting a wavelength selective MOTUS optical engine similar to that described in respect of FIG. 15B in that a waveguide 1530 is disposed upon a beam 1540 coupled to a MEMS actuator via a pivot point such that the tip of the waveguide 1530 can be rotated and aligned to the selected optical waveguide. As with FIG. 15B the input to the WSR 1650 is via an input waveguide 1630 upon the MEMS structure. It would be evident that the rotary MEMS actuators depicted within FIGS. 15B and 16B may be replaced with lateral linear and/or lateral angular MEMS actuators allowing the input waveguide to be directly along the beam without requiring the 90° bend.

Figure 17:
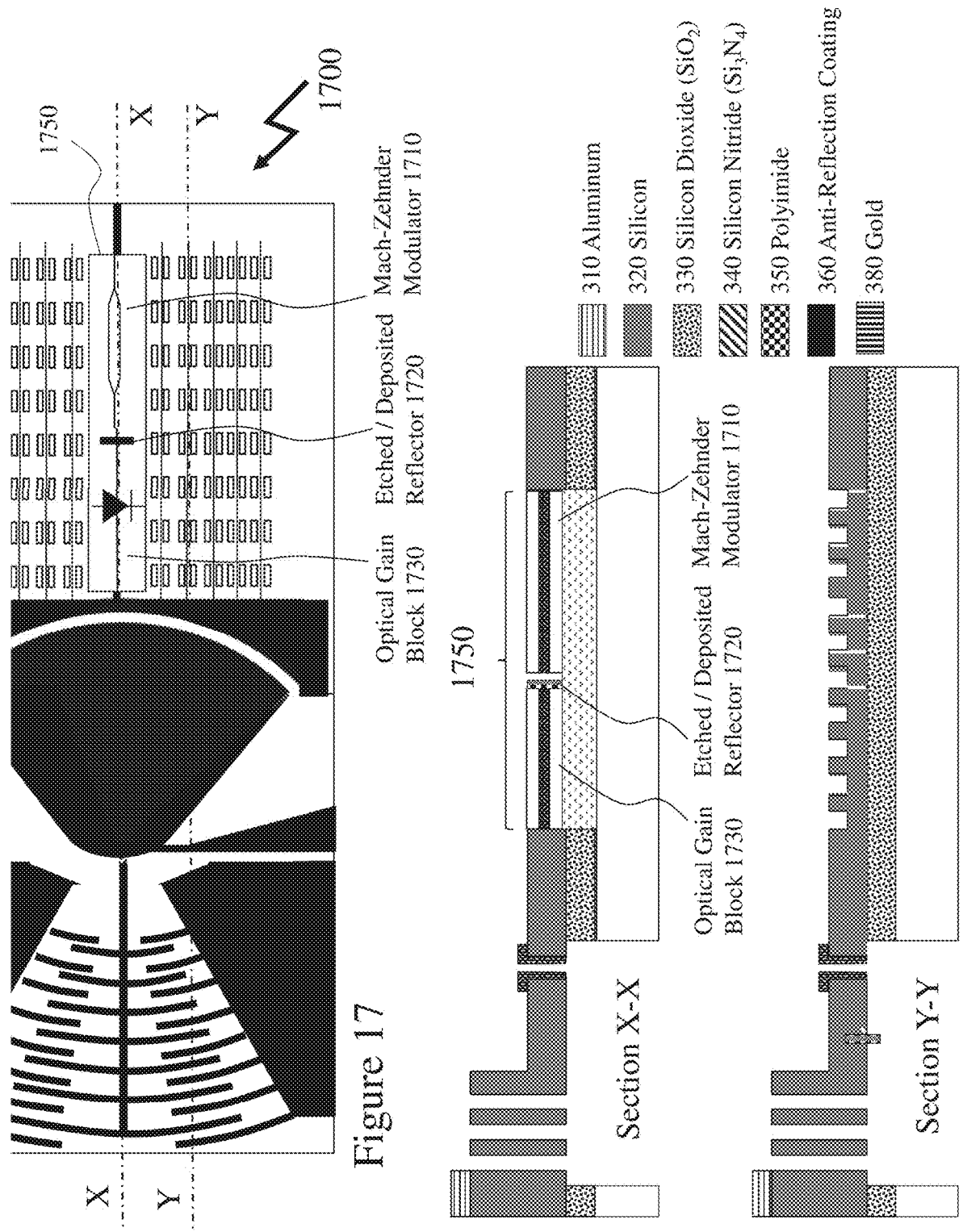
FIG. 17 depicts an optical transmitter exploiting MEMS mirror element in conjunction with wavelength selective reflecting elements in silicon with integrated semiconductor die containing an optical gain block, a high reflectivity mirror, and external modulator.

Now referring to FIG. 17 there are depicted first and second cross-sections X-X and Y-Y through a wavelength selective optical transmitter according to an embodiment of the invention incorporating integrated semiconductor structure 1750 comprising a semiconductor optical gain block 1730, high reflectivity mirror 1720, and external Mach-Zehnder modulator 1710. Second cross-section Y-Y is depicted as the cross-section through the SC-MEMS and Bragg waveguide grating. As depicted in first cross-section X-X according to this embodiment of the invention the semiconductor structure 1750 has been deposited directly onto the silicon substrate of the silicon-on-insulator structure such the waveguide sections of the semiconductor structure 1750 are butt-coupled to the silicon core waveguides of the MOTUS optical engine. Whilst these interfaces are depicted as being perpendicular within FIG. 17 these interfaces may be angled to suppress return loss as in fact they may also be in the other embodiments of the invention in FIGS. 14 and 15 for example wherein hybrid flip-chip integration is depicted. According to the operating wavelength of the MOTUS the semiconductor structures may be AlGaInAs, InGaAsP, and GaAs based for example.

Within other embodiments of the invention according to variations of flip-chip mounting the semiconductor optical gain block and external modulator evanescent coupling from the passive waveguides, see for example Park et al. in "A Hybrid AlGaInAs—Silicon Evanescent Amplifier" (IEEE Phot. Tech. Lett., Vol. 19, pp. 230-232) and Bowers et al. in "Integrated Optical Amplifiers on Silicon Waveguides" (Proc. Integrated Photonics and Nanophotonics Research and Applications, Paper ITuG1, 2007).

Within other embodiments of the invention the semiconductor optical laser may be formed within the silicon core waveguides using concepts including, but not limited to, microring lasers. At other wavelength ranges, e.g. 1300 nm, structures such as semiconductor components comprising a Si substrate, an active region, and a Si capping layer on said active region. The active region, see U.S. Pat. No. 6,403, 975, may be a superlattice comprising alternating layers of $Si(1-y)C(y)$ and $Si(1-x-y)Ge(x)C(y)$. In another embodiment it is a superlattice comprising a plurality of periods of a three-layer structure comprising Si, $Si(1-y)C(y)$ and $Si(1-x)Ge(x)$ and in another a plurality of periods of a three-layer structure comprising Si, $Si(1-y)C(y)$ and $Si(1-x-y)Ge(x)C(y)$ layers.

Figure 18:
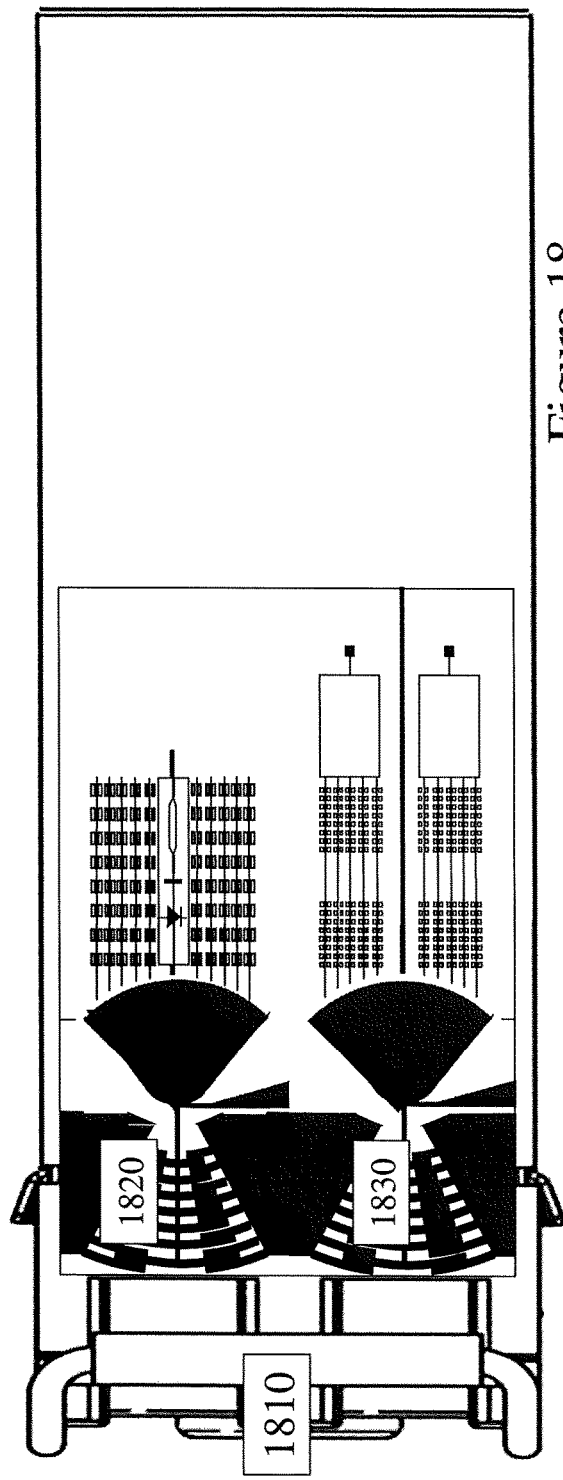
FIG. 18 depicts a transceiver employing transmitter and receiver optical sub-assemblies according to an embodiment of the invention exploiting MEMS mirror elements in conjunction with wavelength selective elements.

FIG. 18 depicts a transceiver 1810 employing a transmitter optical sub-assembly (TOSA) 1820 and a receiver optical sub-assembly (ROSA) 1830 exploiting tunable transmitter and receiver optical engines according to embodiments of the invention described supra in exploiting MEMS mirror elements in conjunction with wavelength selective elements. Accordingly, as depicted the transceiver 1810, e.g. an SFP transceiver, may be fitted to systems and in fact directly onto server blades etc. whilst providing tunable transmit and receive functionality rather than the standard colourless modules currently commercially available or coloured as discussed supra in respect of FIG. 12 by embedded Bragg gratings/C+L filters into connector assemblies for example.

Figure 19:
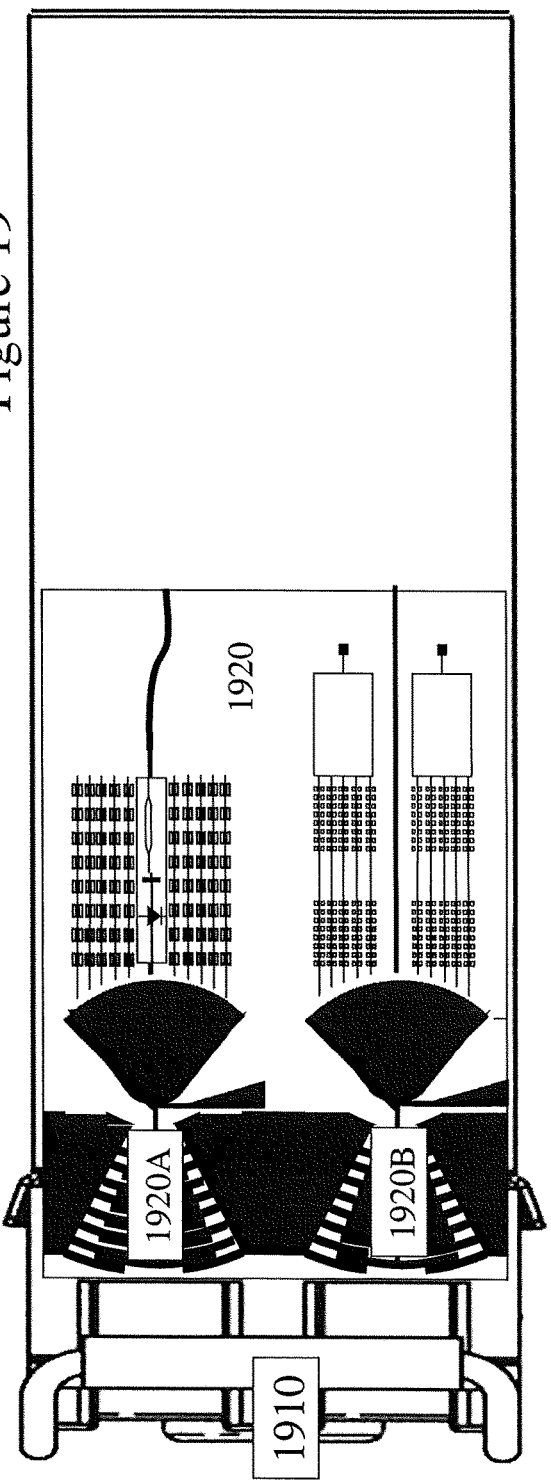
FIG. 19 depicts a transceiver employing a single silicon circuit comprising transmitter and receiver optical sub-assemblies according to an embodiment of the invention exploiting MEMS mirror elements in conjunction with wavelength selective elements.

FIG. 19 depicts a transceiver 1910 employing a single integrated TOSA/ROSA sub-assembly 1920 wherein the TOSA and ROSA each exploit tunable transmitter and receiver optical engines according to embodiments of the invention described supra in exploiting MEMS mirror elements in conjunction with wavelength selective elements. Accordingly, as depicted the transceiver 1910, e.g. an SFP transceiver, may be fitted to systems and in fact directly onto server blades etc. whilst providing tunable transmit and receive functionality rather than the standard colourless modules currently commercially available or coloured as discussed supra in respect of FIG. 12 by embedded Bragg gratings/C+L filters into connector assemblies for example.

Figure 20:
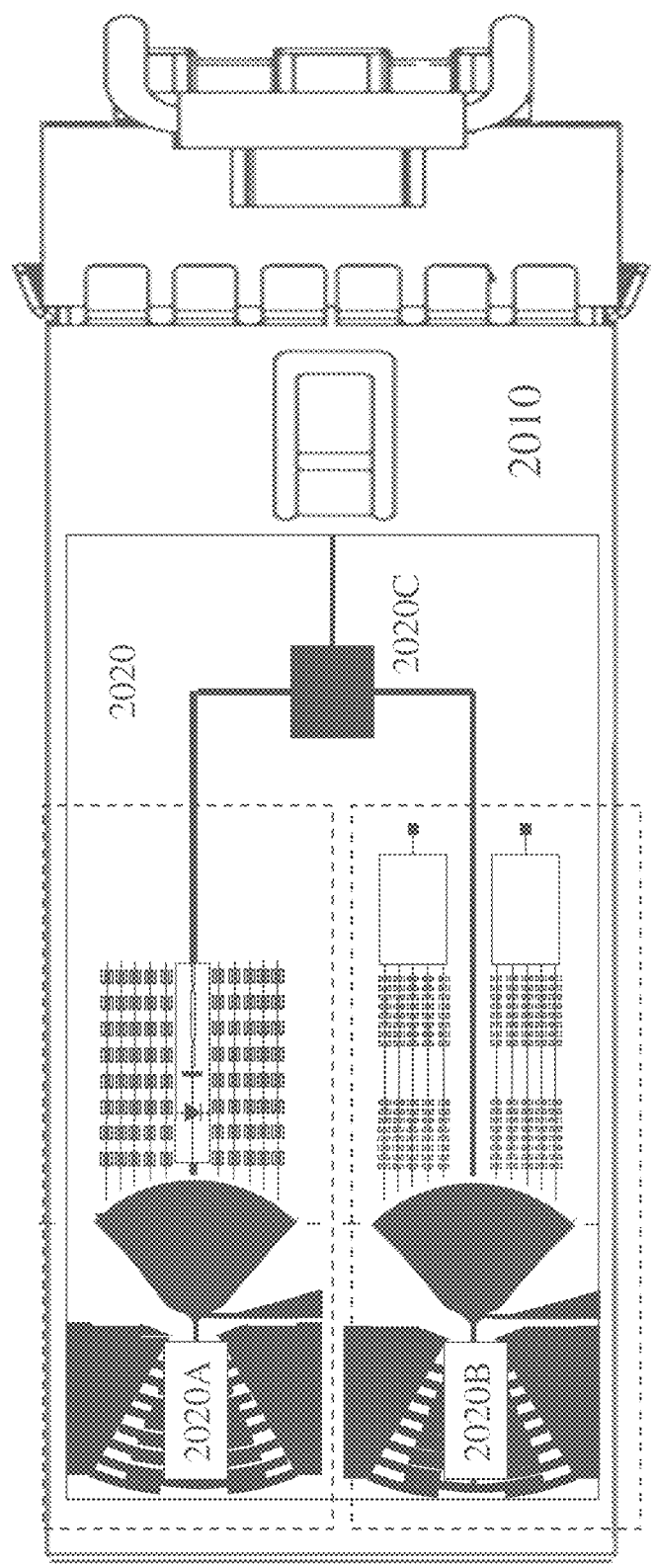
FIG. 20 depicts a transceiver employing a single silicon circuit comprising transmitter and receiver optical sub-assemblies according to an embodiment of the invention exploiting MEMS mirror elements in conjunction with wavelength selective elements together with a C+L filter.

FIG. 20 depicts a transceiver 2010 employing a single integrated TOSA/ROSA sub-assembly 2020 wherein the TOSA 2020A and ROSA 2020B each exploit tunable transmitter and receiver optical engines according to embodiments of the invention described supra in exploiting MEMS mirror elements in conjunction with wavelength selective elements. Additionally the single integrated TOSA/ROSA sub-assembly 2020 incorporates a C+L filter 2020C such that the transceiver 2010 may be C-band receive and L-band transmit for example or L-band receive and C-band transmit. It would be evident that in other embodiments of the invention the TOSA 2020A and ROSA 2020B may contain wavelength selective elements that are both C and L band. In this instance, the C+L filter 2020C may be replaced with a compact optical isolator. Similarly, such an optical isolator may be employed with the single integrated TOSA/ROSA sub-assembly 1920 within the transceiver 1910 of FIG. 19 to provide single fiber operation or with the TOSA 1820 and ROSA 1830 of transceiver 1810 in FIG. 18 for similar single fiber operation. The optical isolator may be a compact free-space design such as known in the art or a monolithically integrated isolator.

6. Silicon MEMS Based Optical Switch Matrices

Figure 25:
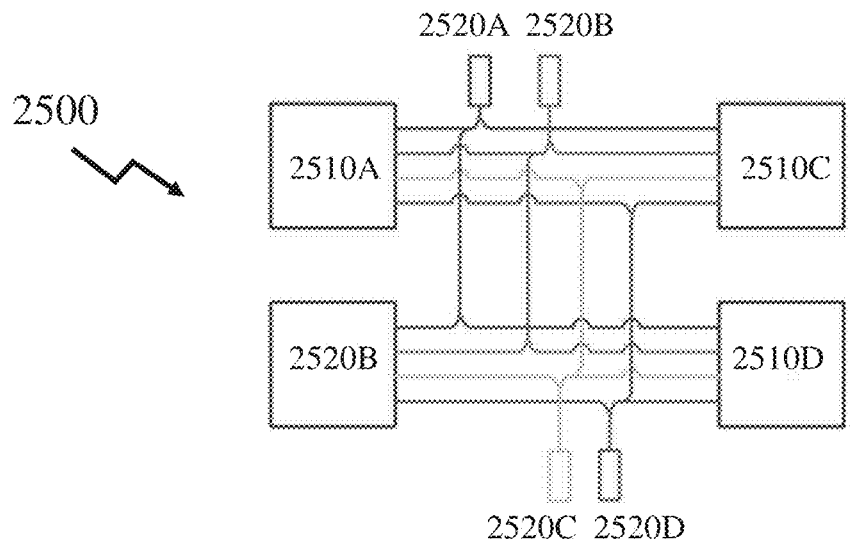
FIGS. 25 and 26 there are depicted 4×4 and 8×8 optical switch matrices according to embodiments of the invention employing 1×4 and 1×8 MOTUS optical engines and directional couplers for enhanced layout and reduced cross-overs.
Figure 26:
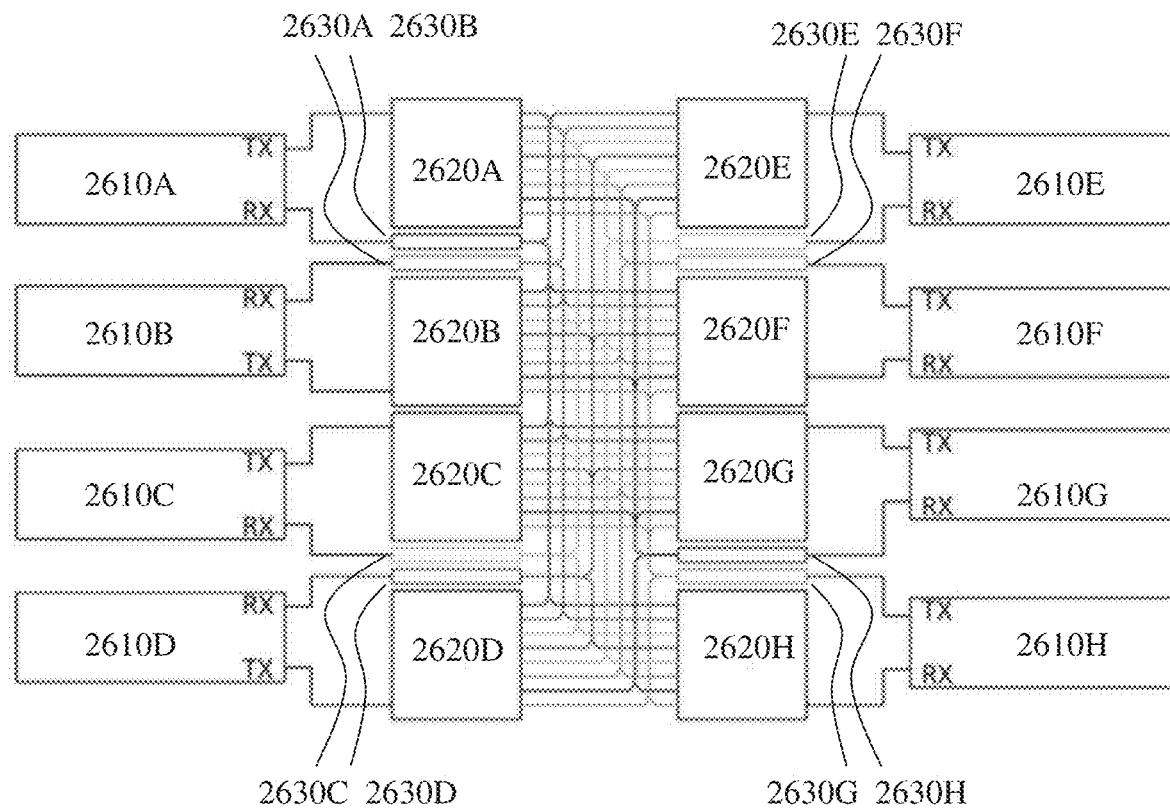

Now referring to FIGS. 25 and 26 there are depicted 4×4 and 8×8 optical switch matrices according to embodiments of the invention employing and MOTUS optical engines respectively in conjunction with directional coupler based routing to the optical receivers. Within FIG. 25 a 4×4 optical switch 2500 comprises first to fourth MOTUS optical engines 2510A to 2510D which are coupled to data sources, not shown for clarity, and select an output port for transmission to a selected receiver of first to fourth optical receivers 2520A to 2520D respectively under control of a controller, not shown for clarity. Each output port from a MOTUS optical engine 2510A to 2510D respectively is coupled via one or more directional couplers to the selected receiver. Due to the design of the cross-over matrix each optical path consists of horizontal and vertical links to/from the directional couplers such that optical cross-overs between paths are 90 degrees for high crosstalk and low loss. However, the architecture also reduces the number of cross-connects when compared to a conventional fully connected architecture.

In contrast, in FIG. 26 an extension of the design methodology is presented for switch matrix wherein first to eighth pluggable transceivers 2610A to 2610H are coupled to first to eighth MOTUS optical switches 2620A to 2620H and first to eighth receivers 2630A to 2630H respectively. The optical output of each first to eighth MOTUS optical switches 2620A to 2620H is coupled to a directional coupler based routing matrix and therein to the appropriate receiver of the first to eighth receivers 2630A to 2630H respectively. This configuration provides for loop-back whereas if this feature is not required the matrix can be reduced to a multiple fiber interconnect. Again due to the design of the cross-over matrix each optical path consists of horizontal and vertical links from each MOTUS optical switch to a receiver via the directional couplers such that optical cross-overs between paths are 90 degrees for high crosstalk and low loss. Again, the architecture also reduces the number of cross-connects when compared to a conventional fully connected architecture.

Figure 27:
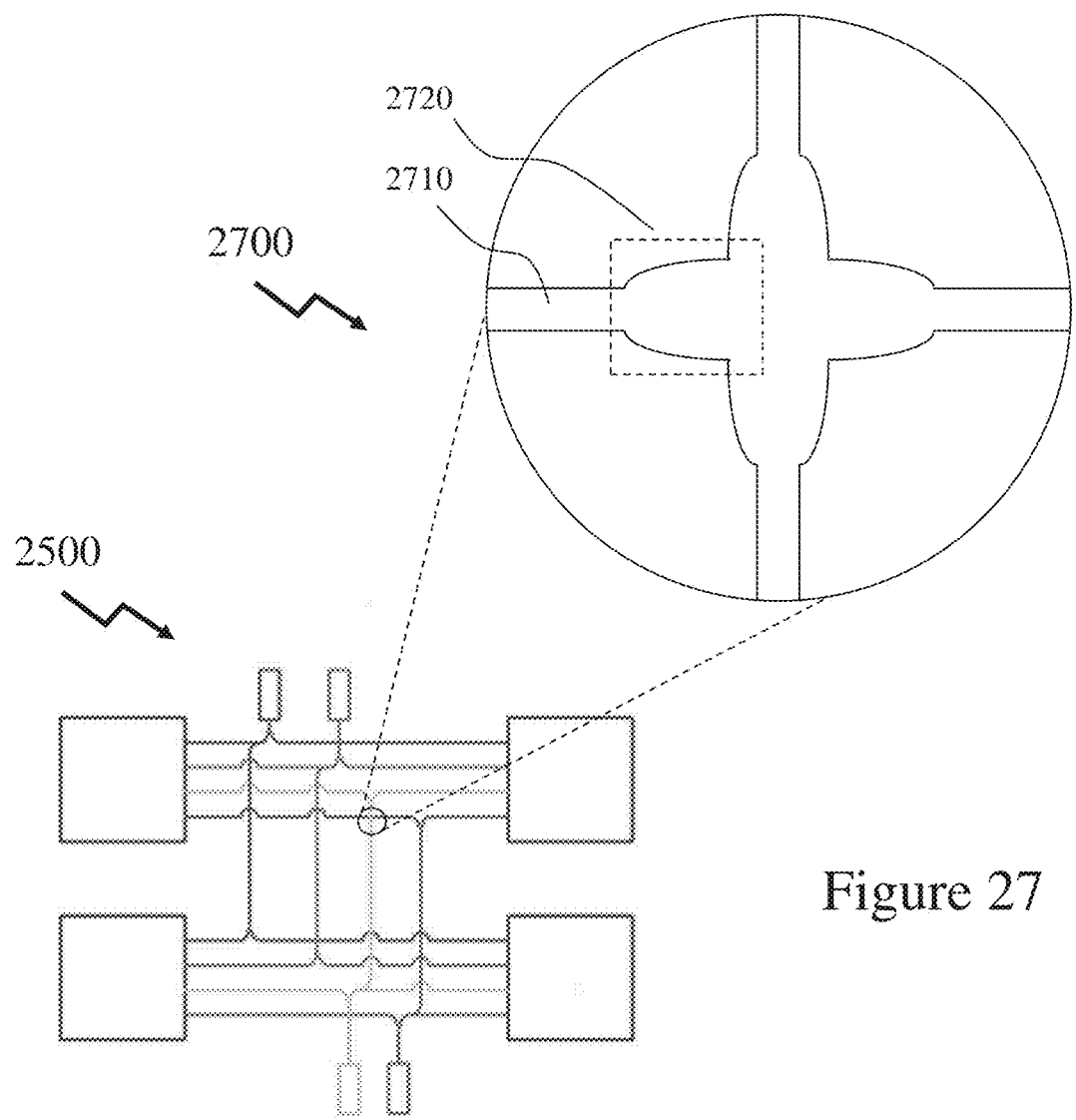
FIG. 27 depicts an optical waveguide crossover according to an embodiment of the invention exploited within the 4×4 and 8×8 optical switch matrices depicted in FIGS. 25 and 26.

Referring to FIG. 27 there is depicted a cross-over 2700 according to an embodiment of the invention such as implemented within 4×4 optical switch 2500. At the cross-over 2700 each optical waveguide 2710 has a taper 2720 expanding the optical beam thereby improving the performance of the cross-over 2700. Within the tapers 2720 sub-wavelength nanostructures may be formed to further improve the performance of the cross-over by enhancing mode conversion to an expanded beam. Accordingly, insertion loss may be reduced.

Within the embodiments of the invention described supra in respect of tunable WDM transmitters, WDM receivers, ROADMs, ROADSTERs, WSS, etc. the devices have been described based upon tunable MEMS mirrors operating in conjunction with Bragg gratings to provide multiple channel tunability. Accordingly, the embodiments of the invention exploit what the inventors call a MOTUS optical engine. Accordingly, these devices allow for gridless OADMs, ROADMS, WSS etc. as currently described.

Considering the ROADSTER described in respect of FIGS. 6 and 8 it would be evident that the centre wavelength of the Bragg gratings may be thermally and/or mechanically tuned to offset their grids such that they sit on a predetermined grid or are offset by 50 GHz. Alternatively, as the MOTUS optical engine may support according to its design coupling to a larger number of waveguides then potentially a MOTUS optical engine may be implemented with say 2 CWDM gratings, 5×200 GHz gratings, 10×100 GHz gratings, and 20×50 GHz gratings (or 10×50 GHz gratings with thermal and/or mechanical tuning). In this manner a MOTUS optical engine may support gridless networks as it is only when installed and programmed that the device is configured as being a 200 GHz device, 50 GHz device, or even a CWDM or 100 GHz device. Within other embodiments of the MOTUS the planar waveguide Bragg structures and MOEMS mirror may be replaced with a MOEMS incorporating an echelle or echelon grating, for example, such that direct filtering is implemented within the MOEMS in conjunction with the input and/or output waveguides. Such MOTUS structures would be truly gridless by virtue of providing continuous wavelength filtering across their designed range.

In other embodiments of the invention for example 10 C-band 100 GHz gratings may be provided together with 10 L-band 100 GHz gratings in order to provide C or L band operation or even devices that can operate across both in networks exploiting concurrent unidirectional C and L band transmission rather than the more common C band in one direction and L band in the other. Equally, non-standard wavelength grid patterns may be implemented.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A pluggable transmitter device comprising:
   a pluggable optic housing;
   N output ports of the device comprising either a plurality of first optical connectors or a plurality of first optical pigtails; and
   a MEMS based 1×N optical switch employing a first rotatable microoptoelectromechanical systems (MOEMS); wherein
   the single input of the MEMS based 1×N optical switch is coupled to an optical transmitter; and
   the N outputs of the MEMS based 1×N optical switch are coupled to the N output ports of the device; wherein
   N is an integer greater than 1; and
   the first rotatable MOEMS comprises
   a substrate; and
   a microoptoelectromechanical systems (MOEMS) element integrated upon the substrate comprising:
      a beam having a first free end and a second distal end coupled to a microelectromechanical systems (MEMS) actuator;
      a pivot disposed at the second distal end of the beam comprising a structure attached to a substrate upon which the rotatable MOEMS is formed;
      a first optical waveguide having a first portion upon the pivot and a second portion running along the beam from the pivot to the first free end of the beam; and
      N second optical waveguides formed upon the substrate, each second optical waveguide having a first end coupled to a predetermined output of the N outputs of the MEMS based 1×N optical switch and a second distal end disposed in a predetermined position with respect to the MOEMS element; wherein the first free end of the beam rotates relative to the pivot under action of the MEMS actuator coupled to the second distal end of the beam;

the first portion of the first optical waveguide is coupled to the single input of the MEMS based 1×N optical switch; and rotation of the first free end of the beam to a predetermined rotation angle optically couples the first optical waveguide to a predetermined second optical waveguide of the N optical waveguides.

2. The pluggable transmitter device according to claim 1, further comprising
an optical receiver.

3. The pluggable transmitter device according to claim 1, further comprising
one or more optical detectors;
an input port; and
a programmable wavelength filter comprising a MEMS based 1×N optical switch and N wavelength filters; wherein
the programmable wavelength filter receives optical signals coupled to the input port and provides wavelength filtered optical signals to an optical detector of the one or more optical detectors.

4. The pluggable transmitter device according to claim 1, further comprising
N input ports comprising either a plurality of second optical connectors or a plurality of second optical pigtails;
a MEMS based N×1 optical switch employing a second rotatable microoptoelectromechanical systems (MOEMS); wherein
the single output of the MEMS based N×1 optical switch is coupled to an optical receiver;
the N inputs of the MEMS based N×1 optical switch are coupled to the N input ports of the device; and
the second rotatable MOEMS comprises
another substrate;
another microoptoelectromechanical systems (MOEMS) element integrated upon the another substrate comprising:
another beam having a first free end and a second distal end coupled to another microelectromechanical systems (MEMS) actuator;
another pivot disposed at the second distal end of the another beam comprising a structure attached to the another substrate upon which the rotatable MOEMS is formed;
another first optical waveguide having a first portion upon the another pivot and a second portion running along the another beam from the second pivot to the first free end of the another beam; and
N other second optical waveguides formed upon the substrate, each other second optical waveguide having a first end coupled to the predetermined output of the N outputs of the MEMS based N×1 optical switch and a second distal end disposed in a predetermined position with respect to the MOEMS element; wherein the first free end of the another beam rotates relative to the another pivot under action of the another MEMS actuator coupled to the second distal end of the another beam; and rotation of the first free end of the another beam to a predetermined rotation angle optically couples the other first optical waveguide to a predetermined other second optical waveguide of the N other second optical waveguides.

5. The pluggable transmitter device according to claim 1, wherein
the optical transmitter comprises an optical amplifier disposed between a first broadband reflector of predetermined reflectivity and a programmable reflective wavelength filter.

6. The pluggable transmitter device according to claim 1, wherein
the optical transmitter comprises an optical amplifier disposed between a first broadband reflector of predetermined reflectivity and a programmable reflective wavelength filter; and
the programmable reflective wavelength filter comprises a MEMS based 1×N optical switch and N reflective wavelength filters.

7. The pluggable transmitter device according to claim 1, further comprising
the optical transmitter.

8. A transmitter circuit comprising:
a first module providing a 1×N optical switch; and
a second module providing an optical transmitter; wherein
N is an integer greater than 1; and
the first module comprises:
N output ports of the device comprising either a plurality of first optical connectors or a plurality of first optical pigtails;
the 1×N optical switch is a MEMS based 1×N optical switch employing a first rotatable microoptoelectromechanical systems (MOEMS) element; wherein
the single input of the MEMS based 1×N optical switch is coupled to the optical transmitter;
the N outputs of the MEMS based 1×N optical switch are coupled to the N output ports of the device;
the first rotatable MOEMS comprises
a substrate;
a microoptoelectromechanical systems (MOEMS) element integrated upon the substrate comprising:
a beam having a first free end and a second distal end coupled to a microelectromechanical systems (MEMS) actuator;
a pivot disposed at the second distal end of the beam comprising a structure attached to a substrate upon which the rotatable MOEMS is formed;
a first optical waveguide having a first portion upon the pivot and a second portion running along the beam from the pivot to the first free end of the beam; and
N second optical waveguides formed upon the substrate, each second optical waveguide having a first end coupled to a predetermined output of the N outputs of the MEMS based 1×N optical switch and a second distal end disposed in a predetermined position with respect to the MOEMS element;
the first free end of the beam rotates relative to the pivot under action of the MEMS actuator coupled to the second distal end of the beam;
the first portion of the first optical waveguide is coupled to the single input of the MEMS based 1×N optical switch; and rotation of the first free end of the beam to a predetermined rotation angle optically couples the first optical waveguide to a predetermined second optical waveguide of the N optical waveguides.

9. The transmitter circuit according to claim 8, further comprising
an optical receiver.

10. The transmitter circuit according to claim 8, further comprising
one or more optical detectors;
an input port; and
a programmable wavelength filter comprising a MEMS based 1×N optical switch and N wavelength filters; wherein
the programmable wavelength filter receives optical signals coupled to the input port and provides wavelength filtered optical signals to an optical detector of the one or more optical detectors.

11. The transmitter circuit according to claim 8, further comprising
N input ports comprising either a plurality of second optical connectors or a plurality of second optical pigtails;
a MEMS based N×1 optical switch employing a second rotatable microoptoelectromechanical systems (MOEMS); wherein
the single output of the MEMS based N×1 optical switch is coupled to an optical receiver;
the N inputs of the MEMS based N×1 optical switch are coupled to the N input ports of the device; and
the second rotatable MOEMS comprises
another substrate;
another microoptoelectromechanical systems (MOEMS) element integrated upon the another substrate comprising:
another beam having a first free end and a second distal end coupled to another microelectromechanical systems (MEMS) actuator;
another pivot disposed at the second distal end of the another beam comprising a structure attached to the another substrate upon which the rotatable MOEMS is formed;
another first optical waveguide having a first portion upon the another pivot and a second portion running along the another beam from the second pivot to the first free end of the another beam; and
N other second optical waveguides formed upon the substrate, each other second optical waveguide having a first end coupled to the predetermined output of the N outputs of the MEMS based N×1 optical switch and a second distal end disposed in a predetermined position with respect to the MOEMS element; wherein
the first free end of the another beam rotates relative to the another pivot under action of the another MEMS actuator coupled to the second distal end of the another beam; and
rotation of the first free end of the another beam to a predetermined rotation angle optically couples the other first optical waveguide to a predetermined other second optical waveguide of the N other second optical waveguides.

12. The transmitter circuit according to claim 8, wherein
the optical transmitter comprises an optical amplifier disposed between a first broadband reflector of predetermined reflectivity and a programmable reflective wavelength filter.

13. The transmitter circuit according to claim 8, wherein
the optical transmitter comprises an optical amplifier disposed between a first broadband reflector of predetermined reflectivity and a programmable reflective wavelength filter; and
the programmable reflective wavelength filter comprises a MEMS based 1×N optical switch and N reflective wavelength filters.

14. The transmitter circuit according to claim 8, further comprising
the optical transmitter.

15. A pluggable transmitter device comprising:
a pluggable optic housing;
N output ports of the device comprising either a plurality of first optical connectors or a plurality of first optical pigtails;
a MEMS based 1×N optical switch employing a first rotatable microoptoelectromechanical systems (MOEMS); wherein
the single input of the MEMS based 1×N optical switch is coupled to an optical transmitter; and
the N outputs of the MEMS based 1×N optical switch are coupled to the N output ports of the device; and
the optical transmitter which comprises an optical amplifier disposed between a first broadband reflector of predetermined reflectivity and a programmable reflective wavelength filter; wherein
N is an integer greater than 1;
the programmable reflective wavelength filter comprises a second rotatable MOEMS;
the first rotatable MOEMS comprises
a first substrate;
a first microoptoelectromechanical systems (MOEMS) element integrated upon the first substrate comprising:
a first beam having a first free end and a second distal end coupled to a first microelectromechanical systems (MEMS) actuator;
a first pivot disposed at the second distal end of the first beam comprising a structure attached to a first substrate upon which the first MOEMS element is formed;
a first optical waveguide having a first portion upon the first pivot and a second portion running along the first beam from the pivot to the first free end of the first beam; and
N second optical waveguides formed upon the substrate, each second optical waveguide having a first end coupled to the predetermined output of the N outputs of the MEMS based 1×N optical switch and a second distal end disposed in a predetermined position with respect to the MOEMS element;
the first free end of the first beam rotates relative to the pivot under action of the MEMS actuator coupled to the second distal end of the first beam;
the second portion of the first optical waveguide coupled to the output of the MEMS based 1×N optical switch; and
rotation of the first free end of the first beam to a predetermined rotation angle optically couples the first optical waveguide to a predetermined second optical waveguide of the N second optical waveguides; and the second rotatable MOEMS comprises
a second substrate;
a second microoptoelectromechanical systems (MOEMS) element integrated upon the second substrate comprising:
a second beam having a first free end and a second distal end coupled to a second microelectromechanical systems (MEMS) actuator;
a second pivot disposed at the second distal end of the second beam comprising a structure attached to a second substrate upon which the second rotatable MOEMS is formed;
a third optical waveguide having a first portion upon the second pivot and a second portion running along the second beam from the pivot to the first free end of the beam; and
a plurality of wavelength reflective filters integrated upon the second substrate, each wavelength reflective filter of the plurality of wavelength reflective filters having a first end disposed in a second predetermined position relative to the second MOEMS element and optically coupled to the second MOEMS element; wherein
the second MOEMS element optically couples optical signals from and to the third optical waveguide which are coupled to and from a predetermined wavelength reflective filter of the plurality of wavelength reflective filters which is selected in dependence upon the rotation of the second rotatable MOEMS element.

16. The pluggable transmitter device according to claim 15, further comprising
an optical receiver.

17. The pluggable transmitter device according to claim 15, further comprising
one or more optical detectors;
an input port; and
a programmable wavelength filter comprising a MEMS based 1×N optical switch and N wavelength filters; wherein
the programmable wavelength filter receives optical signals coupled to the input port and provides wavelength filtered optical signals to an optical detector of the one or more optical detectors.

18. The pluggable transmitter device according to claim 15, further comprising
N input ports comprising either a plurality of second optical connectors or a plurality of second optical pigtails;
a MEMS based N×1 optical switch employing a third rotatable microoptoelectromechanical systems (MOEMS); wherein
the single output of the MEMS based N×1 optical switch is coupled to an optical receiver;
the N inputs of the MEMS based N×1 optical switch are coupled to the N input ports of the device; and
the third rotatable MOEMS comprises
a further substrate;
a further microoptoelectromechanical systems (MOEMS) element integrated upon the further substrate comprising:
a further beam having a first free end and a second distal end coupled to a further microelectromechanical systems (MEMS) actuator;
a further pivot disposed at the second distal end of the further beam comprising a structure attached to the further substrate upon which the third rotatable MOEMS is formed;
a further first optical waveguide having a first portion upon the further pivot and a second portion running along the further beam from the second pivot to the first free end of the further beam; and
N further second optical waveguides formed upon the substrate, each further second optical waveguide having a first end coupled to the predetermined output of the N outputs of the MEMS based N×1 optical switch and a second distal end disposed in a predetermined position with respect to the MOEMS element; wherein
the first free end of the further beam rotates relative to the further pivot under action of the further MEMS actuator coupled to the second distal end of the further beam; and
rotation of the first free end of the further beam to a predetermined rotation angle optically couples the other first optical waveguide to a predetermined other second optical waveguide of the N further second optical waveguides.

* * * * *